(12) United States Patent
Wakayama et al.

(10) Patent No.: US 12,105,286 B2
(45) Date of Patent: Oct. 1, 2024

(54) DISPLAY DEVICE AND HELMET

(71) Applicant: Japan Display Inc., Tokyo (JP)

(72) Inventors: Yuzo Wakayama, Tokyo (JP); Yoshihiro Saigo, Tokyo (JP)

(73) Assignee: Japan Display Inc., Tokyo (JP)

( * ) Notice: Subject to any disclaimer, the term of this patent is extended or adjusted under 35 U.S.C. 154(b) by 612 days.

(21) Appl. No.: 17/345,485

(22) Filed: Jun. 11, 2021

(65) Prior Publication Data

US 2021/0302747 A1    Sep. 30, 2021

Related U.S. Application Data

(63) Continuation of application No. PCT/JP2019/031008, filed on Aug. 6, 2019.

(30) Foreign Application Priority Data

Dec. 14, 2018    (JP) .................. 2018-234650

(51) Int. Cl.
    *G02B 27/01*    (2006.01)
    *A42B 3/30*     (2006.01)
    *G02B 3/08*     (2006.01)

(52) U.S. Cl.
    CPC ............ *G02B 27/0172* (2013.01); *A42B 3/30* (2013.01); *G02B 3/08* (2013.01); *G02B 2027/0178* (2013.01)

(58) Field of Classification Search
    None
    See application file for complete search history.

(56) References Cited

U.S. PATENT DOCUMENTS

| 2005/0052348 A1 | 3/2005 | Yamazaki et al. | |
| 2012/0147038 A1* | 6/2012 | Perez ................. | G02B 27/0172 345/632 |
| 2014/0153102 A1* | 6/2014 | Chang ................ | G02B 27/0172 359/630 |
| 2015/0331237 A1 | 11/2015 | Itani | |
| 2017/0053971 A1 | 2/2017 | Sato | |

FOREIGN PATENT DOCUMENTS

| CN | 109085697 A | * 12/2018 | ........... G02B 27/017 |
| JP | H06-326945 A | 11/1994 | |
| JP | H07-143577 A | 6/1995 | |
| JP | H08-160344 A | 6/1996 | |
| JP | 2005-097774 A | 4/2005 | |
| JP | 2013-084477 A | 5/2013 | |

OTHER PUBLICATIONS

International Search Report mailed on Sep. 24, 2019 for the corresponding PCT Application No. PCT/JP2019/031008, with English machine translation.

\* cited by examiner

*Primary Examiner* — Bao-Luan Q Le
*Assistant Examiner* — Danell L Owens
(74) *Attorney, Agent, or Firm* — Michael Best & Friedrich LLP

(57) ABSTRACT

According to one embodiment, a display device includes a transparent display including a display area including a plurality of pixels, a first surface including a display surface, and a second surface at an opposite side to the first surface and a first optical element provided at a second surface side of the transparent display, and the first optical element is configured to refract entering light and to diverge the entering light.

14 Claims, 18 Drawing Sheets

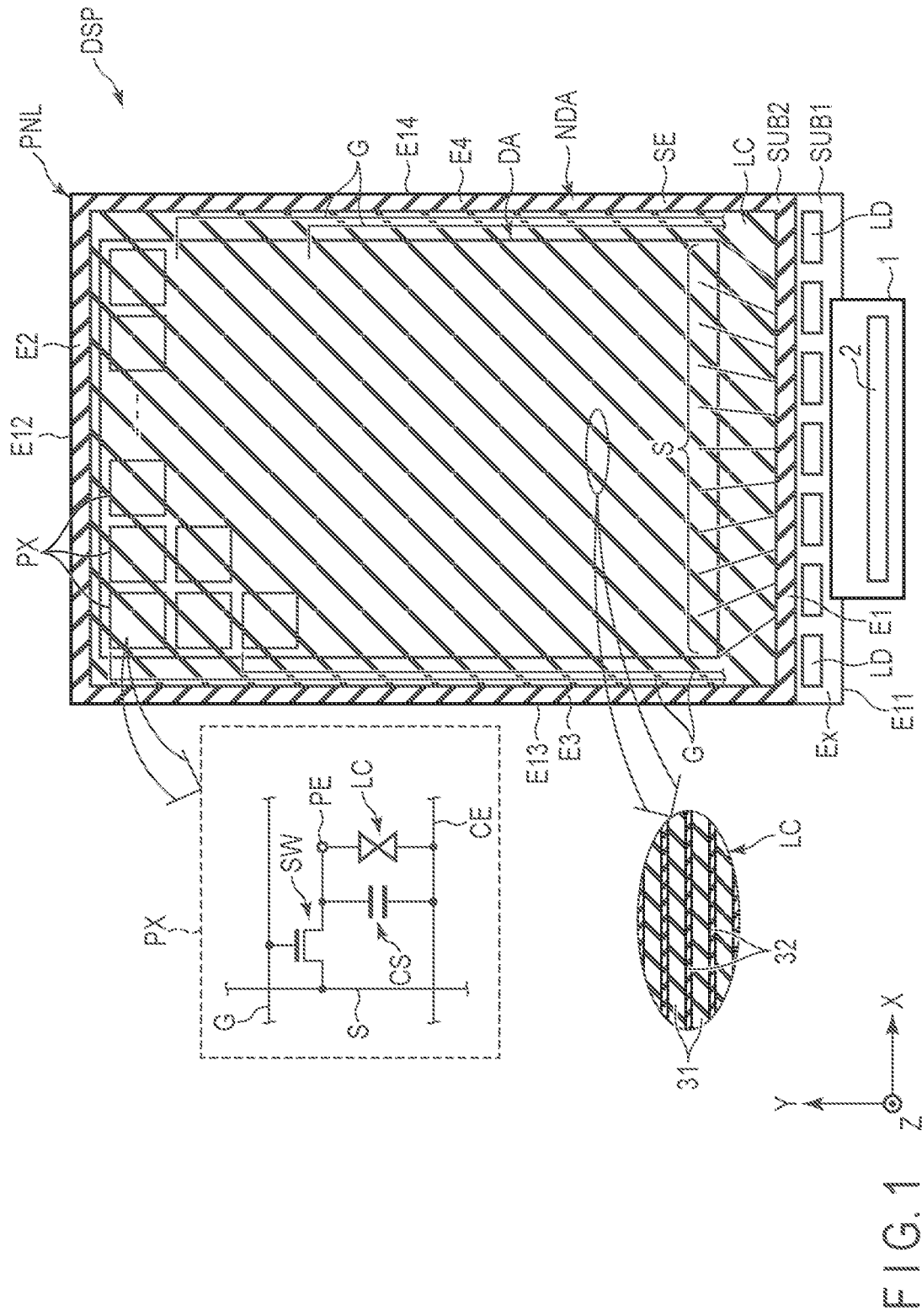
F I G. 1

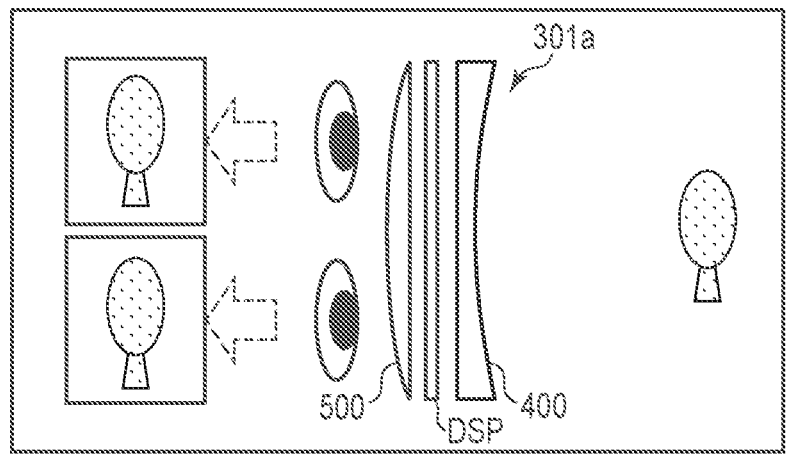
F I G. 16
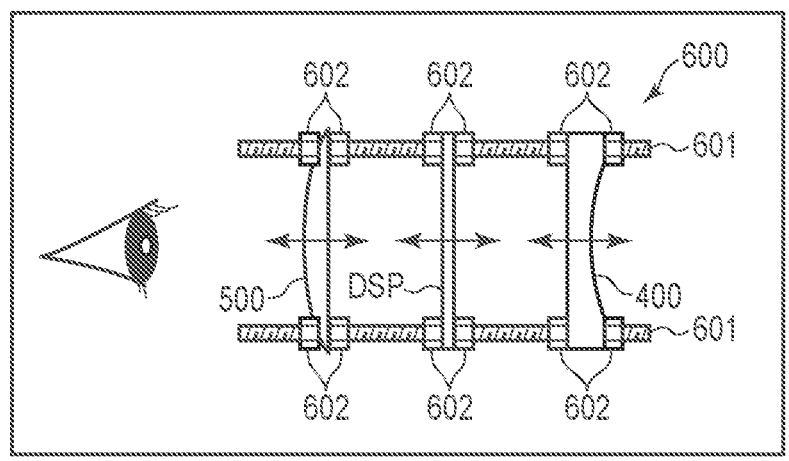
F I G. 17

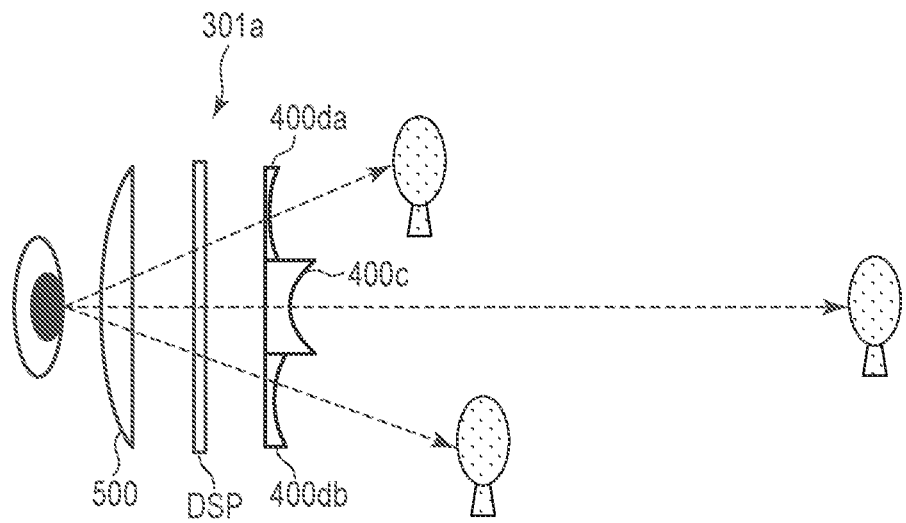
F I G. 24
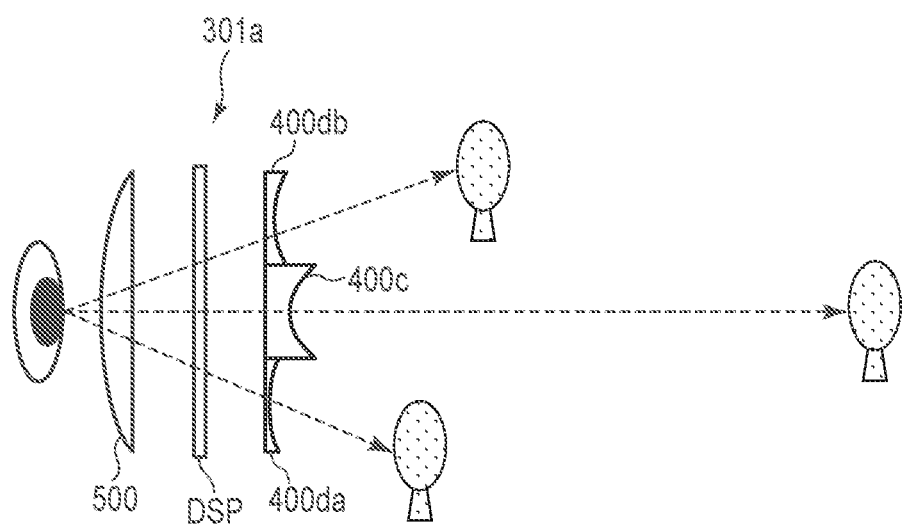
F I G. 25

DISPLAY DEVICE AND HELMET

CROSS-REFERENCE TO RELATED APPLICATIONS

This application is a Continuation Application of PCT Application No. PCT/JP2019/031008, filed Aug. 6, 2019 and based upon and claiming the benefit of priority from Japanese Patent Application No. 2018-234650, filed Dec. 14, 2018, the entire contents of all of which are incorporated herein by reference.

FIELD

Embodiments described herein relate generally to a display device and a helmet. Further, the embodiments relate to a wearable display device and a wearable equipment (helmet, glasses, etc.) comprising a display panel.

BACKGROUND

In recent years, the technology of mixed reality (MR), which superimposes various information synthesized by computer processing on the real world perceived by humans and amplifies the real world has become popular. Examples of the method of realizing MR are a method employing a transmissive display device, a method of employing a display device comprising a transparent display and the like.

When a transmissive display device is employed, the user visually recognizes the real world (background, distant view) while the transmissive display device is located in front of the user's eyes. Here, there rises a problem in which the user cannot focus on the information displayed on the transmissive display device located at a short distance (that is, the near view) and the distant view at the same time due to the difference in the focal lengths, and therefore, either one is focused on, the other appears blurry.

This problem can be solved by the user alternately focusing on the near view and the distant view, but this method requires refocusing many times, which rises another problem of causing a great stress on the user's eyes.

BRIEF DESCRIPTION OF THE DRAWINGS

FIG. 1 is a diagram showing a configuration example of a transparent display of the present embodiment.

FIG. 16 is a diagram illustrating another method of applying the display device shown in FIG. 14.

FIG. 17 is a diagram showing still another configuration example of the display device of this embodiment.

FIG. 24 is a diagram showing still another configuration example of the display device of this embodiment.

FIG. 25 is a diagram showing still another configuration example of the display device of this embodiment.

DETAILED DESCRIPTION

Figure 2:
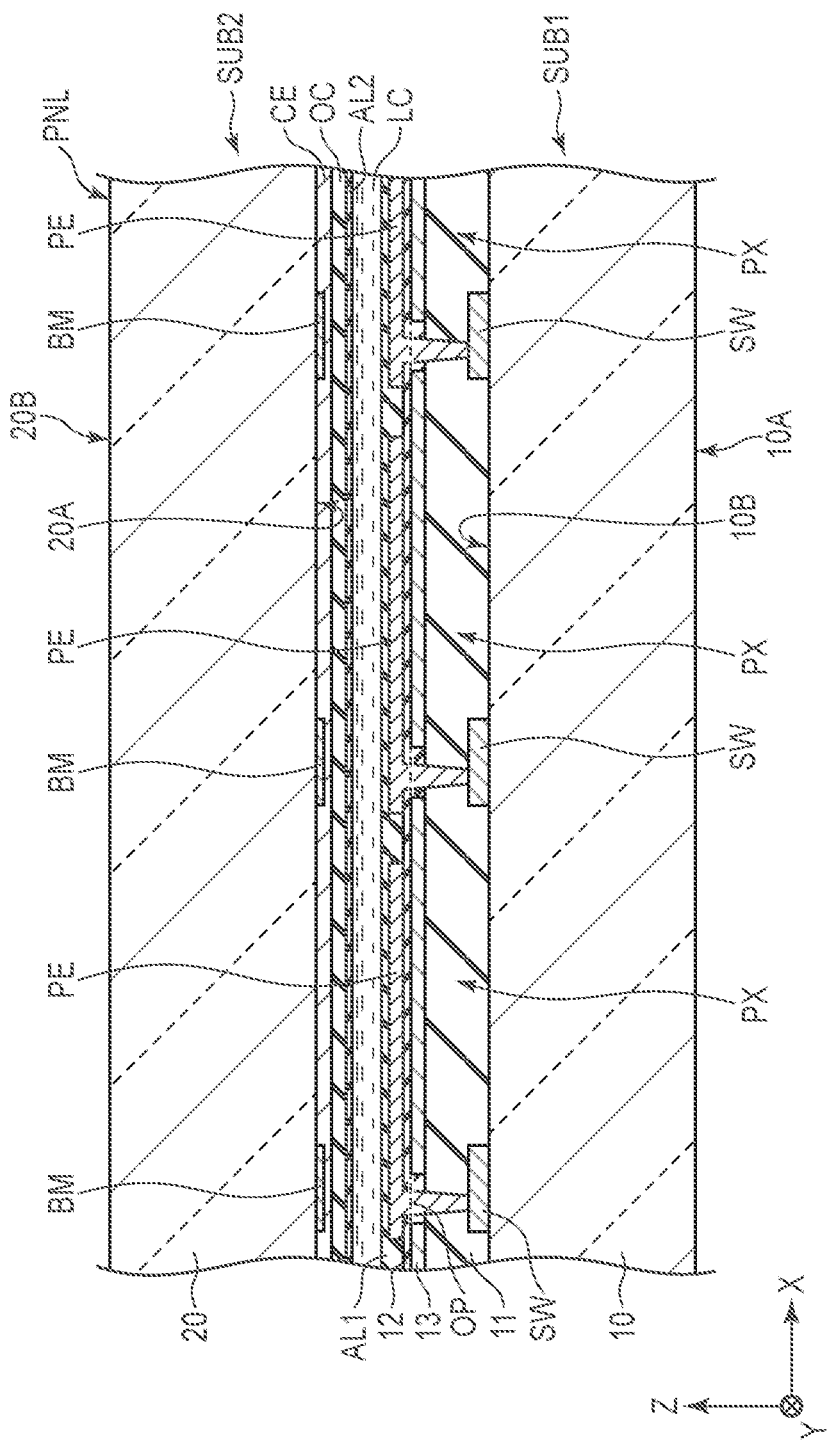
FIG. 2 is a cross-sectional view showing a configuration example of a display panel shown in FIG. 1.

In general, according to one embodiment, a display device comprises a transparent display comprising a display area including a plurality of pixels, a first surface comprising a display surface, and a second surface at an opposite side to the first surface and a first optical element provided at a second surface side of the transparent display, and the first optical element is configured to refract first entering light and to diverge the first entering light.

Embodiments will be described below with reference to the accompanying drawings.

It should be noted that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, reference numerals may be omitted for the same or similar elements arranged successively. Further, in the present specification and the drawings, components having the same or similar functions as those described above with respect to the already-existing drawings are designated by the same reference numerals, and redundant description may be omitted.

Hereinafter, first, a configuration of a transparent display DSP to be applied to a display device of this embodiment will be described. In this embodiment, a "transparent display" means a display that transmits light between a first surface (display surface) to be viewed by the user and a second surface (rear surface) on an opposite side thereto. According to such a transparent display DSP, the user can view the background on a second surface side from a first surface side, and also can view the background on the first surface side from the second surface side. The "transparent display" includes a transmissive portion that transmits light between the first surface (display surface) to be viewed by the user and the second surface (rear surface) on an opposite side to the first surface, and a display comprising a light-emitting portion that displays images, that is, for example, a transparent OLED display.

FIG. 1 is a plan view showing a configuration example of the transparent display DSP of this embodiment. For example, a first direction X, a second direction Y and a third direction Z are orthogonal to each other, but may intersect at an angle other than 90 degrees. The first direction X and the second direction Y correspond to directions parallel to a main surface of the substrate which constitutes the transparent display DSP, and the third direction Z corresponds to a thickness direction of the transparent display DSP. An observation position at which the transparent display DSP is observed is assumed to be located on the tip side of the arrow indicating the third direction Z, and viewing from the observation position toward the X-Y plane defined by the first direction X and the second direction Y is called a planar view.

In this embodiment, a liquid crystal display device to which polymer dispersed liquid crystal is applied will be described as an example of the transparent display DSP. The transparent display DSP comprises a display panel PNL, a wiring substrate 1, an IC chip 2, and light-emitting devices LD.

The display panel PNL comprises a pair of short edges E11 and E12 extending along the first direction X and a pair of long edges E13 and E14 extending along the second direction Y. The display panel PNL comprises a first substrate SUB1, a second substrate SUB2, a liquid crystal layer LC and a sealant SE. The first substrate SUB1 and the second substrate SUB2 are superposed each other in planar view. The first substrate SUB1 and the second substrate SUB2 are adhered by the sealant SE. The sealant SE is formed into, for example, a loop shape and does not include a liquid crystal injection port and a sealing material. The liquid crystal layer LC is held between the first substrate SUB1 and the second substrate SUB2 and is sealed by the sealant SE. In FIG. 1, the liquid crystal layer LC and the sealant SE are indicated by different diagonal lines.

For example, the sealant SE is formed into a rectangular frame shape surrounding the liquid crystal layer LC, and includes portions E1 and E2 extending along the first direction X and portions E3 and E4 extending along the second direction Y. The portions E1 to E4 are in contact with the liquid crystal layer LC. Note that the sealant SE may be formed into a circular frame shape or some other shape.

As shown in an enlarged schematic view in FIG. 1, the liquid crystal layer LC contains a polymer-dispersed liquid crystal including polymers 31 and liquid crystal molecules 32. For example, the polymers 31 are of a liquid crystalline polymer. The polymers 31 are formed into a streak shape extending along the first direction X. The liquid crystal molecules 32 are dispersed in gaps between the polymers 31 and are aligned so that their longitudinal axes are arranged along the first direction X. Each of the polymers 31 and the liquid crystal molecule 32 has optical anisotropy or refractive index anisotropy. The responsiveness of the polymers 31 to the electric field is lower than the responsiveness of the liquid crystal molecules 32 to the electric field.

For example, the alignment direction of the polymers 31 does not substantially change regardless of the presence or absence of an electric field. On the other hand, the alignment direction of the liquid crystal molecules 32 changes according to the electric field when a high voltage equal to or higher than the threshold value is applied to the liquid crystal layer LC. In a state where no voltage is applied to the liquid crystal layer LC, the optical axes of the polymers 31 and the liquid crystal molecules 32 are parallel to each other, and light entering the liquid crystal layer LC is transmitted therethrough without being substantially scattered in the liquid crystal layer LC (a transparent state). While voltage is being applied to the liquid crystal layer LC, the optical axes of the polymers 31 and the liquid crystal molecules 32 cross each other, and the light entering the liquid crystal layer LC is scattered in the liquid crystal layer LC (a scattered state).

The display panel PNL includes a display portion (display area) DA which displays images, and a frame-shaped non-display area NDA surrounding the display area DA. The sealant SE is located in the non-display area NDA. The display area DA comprises pixels PX arranged in a matrix along the first direction X and the second direction Y.

As shown enlarged in FIG. 1, each pixel PX comprises a switching element SW, a pixel electrode PE, a common electrode CE, a liquid crystal layer LC and the like. The switching element SW is constituted by, for example, a thin film transistor (TFT), and is electrically connected to a scanning line G and a signal line S. The scanning line G is electrically connected to the switching element SW of each of the pixels PX arranged along the first direction X. The signal line S is electrically connected to the switching element SW of each of the pixels PX arranged along the second direction Y. The pixel electrode PE is electrically connected to the switching element SW.

The common electrode CE is provided commonly to a plurality of pixel electrodes PE. The liquid crystal layer LC (particularly, the liquid crystal molecules 32) is driven by the electric field produced between the pixel electrode PE and the common electrode CE. A capacitor CS is formed, for example, between an electrode having the same potential as that of the common electrode CE and an electrode having the same potential as that of the pixel electrode PE.

As will be described later, the scanning lines G, the signal lines S, the switching elements SW and the pixel electrodes PE are provided on the first substrate SUB1, and the common electrode CE is provided on the second substrate SUB2. In the first substrate SUB1, the scanning lines G extend between the display area DA and the portion E3 of the sealant SE and between the display area DA and the portion E4 of the sealant SE, and are electrically connected to the wiring substrate 1 or the IC chip 2. The signal lines S extend between the display area DA and the portion E1 of the sealant SE, and are electrically connected to the wiring substrate 1 or the IC chip 2.

The wiring substrate 1 is electrically connected to an extending portion Ex of the first substrate SUB1. The wiring substrate 1 is a bendable flexible printed circuit board. The IC chip 2 is electrically connected to the wiring substrate 1. The IC chip 2 contains a display driver and the like built therein, which output signals necessary for displaying images, for example. Note that the IC chip 2 may be electrically connected to the extending portion Ex.

The light-emitting devices LD are superposed on the extending portion Ex. The light-emitting devices LD are arranged at intervals along the first direction X.

FIG. 2 is a cross-sectional view showing a configuration example of the display panel PNL shown in FIG. 1.

The first substrate SUB1 comprises a transparent substrate 10, insulating films 11 and 12, a capacitor electrode 13, switching elements SW, pixel electrodes PE and an alignment film AL1. The transparent substrate 10 comprises a main surface (a lower surface) 10A and a main surface (an upper surface) 10B on an opposite side to the main surface 10A. The switching elements SW are arranged on a main surface 10B side. The insulating film 11 covers the switching elements SW. The scanning lines G and the signal lines S shown in FIG. 1 are located between the transparent substrate 10 and the insulating film 11, but the illustration is omitted here. The capacitor electrode 13 is located between the insulating films 11 and 12. The pixel electrodes PE are each disposed for each respective pixel PX between the insulating film 12 and the alignment film AL1. The pixel electrodes PE are electrically connected to the respective switching elements SW via openings OP of the capacitor electrode 13, respectively. The pixel electrodes PE are superposed on the capacitor electrode 13 with the insulating film 12 sandwiched therebetween, thus forming the capacitors CS of the respective pixels PX. The alignment film AL1 covers the pixel electrodes PE.

The second substrate SUB2 comprises a transparent substrate 20, light-shielding layers BM, a common electrode CE, an overcoat layer OC and an alignment film AL2. The transparent substrate 20 comprises a main surface (a lower surface) 20A and a main surface (an upper surface) 20B on an opposite side to the main surface 20A. The main surface 20A of the transparent substrate 20 faces (opposes) the main surface 10B of the transparent substrate 10. The light-shielding layers BM and the common electrode CE are disposed on a main surface 20A side. The light-shielding layers BM are located, for example, immediately above the respective switching elements SW and immediately above the scanning lines G and the signal lines S (not shown), respectively. The common electrode CE is disposed over a plurality of pixels PX and opposes the pixel electrodes PE in the third direction Z. Further, the common electrode CE covers the light-shielding layers BM. The common electrode CE is electrically connected to the capacitor electrode 13 and at the same potential as that of the capacitor electrode 13. The overcoat layer OC covers the common electrode CE. The alignment film AL2 covers the overcoat layer OC.

The liquid crystal layer LC is located between the first substrate SUB1 and the second substrate SUB2 and is in contact with the alignment films AL1 and AL2.

The transparent substrates 10 and 20 are insulating substrates such as glass substrates and plastic substrates. The insulating film 11 is formed of a transparent insulating material such as silicon oxide, silicon nitride, silicon oxynitride or acrylic resin. For example, the insulating film 11 includes an inorganic insulating film and an organic insulating film. The insulating film 12 is an inorganic insulating film such as of silicon nitride. The capacitor electrode 13, the pixel electrodes PE and the common electrode CE are transparent electrodes each made of a transparent conductive material such as indium tin oxide (ITO) or indium zinc oxide (IZO). The light-shielding layers BM are formed of an opaque metal material such as molybdenum, aluminum, tungsten, titanium, silver or the like. Since the common electrode CE is in contact with the light-shielding layers BM, it is electrically connected to the light-shielding layers BM. With this structure, the common electrode CE is made to have a low resistance. The alignment films AL1 and AL2 are horizontal alignment films having an alignment restriction force substantially parallel to the XY plane. For example, the alignment films AL1 and AL2 are subjected to alignment treatment along the first direction X. Note that the alignment treatment may be a rubbing treatment or an optical alignment treatment.

Figure 3:
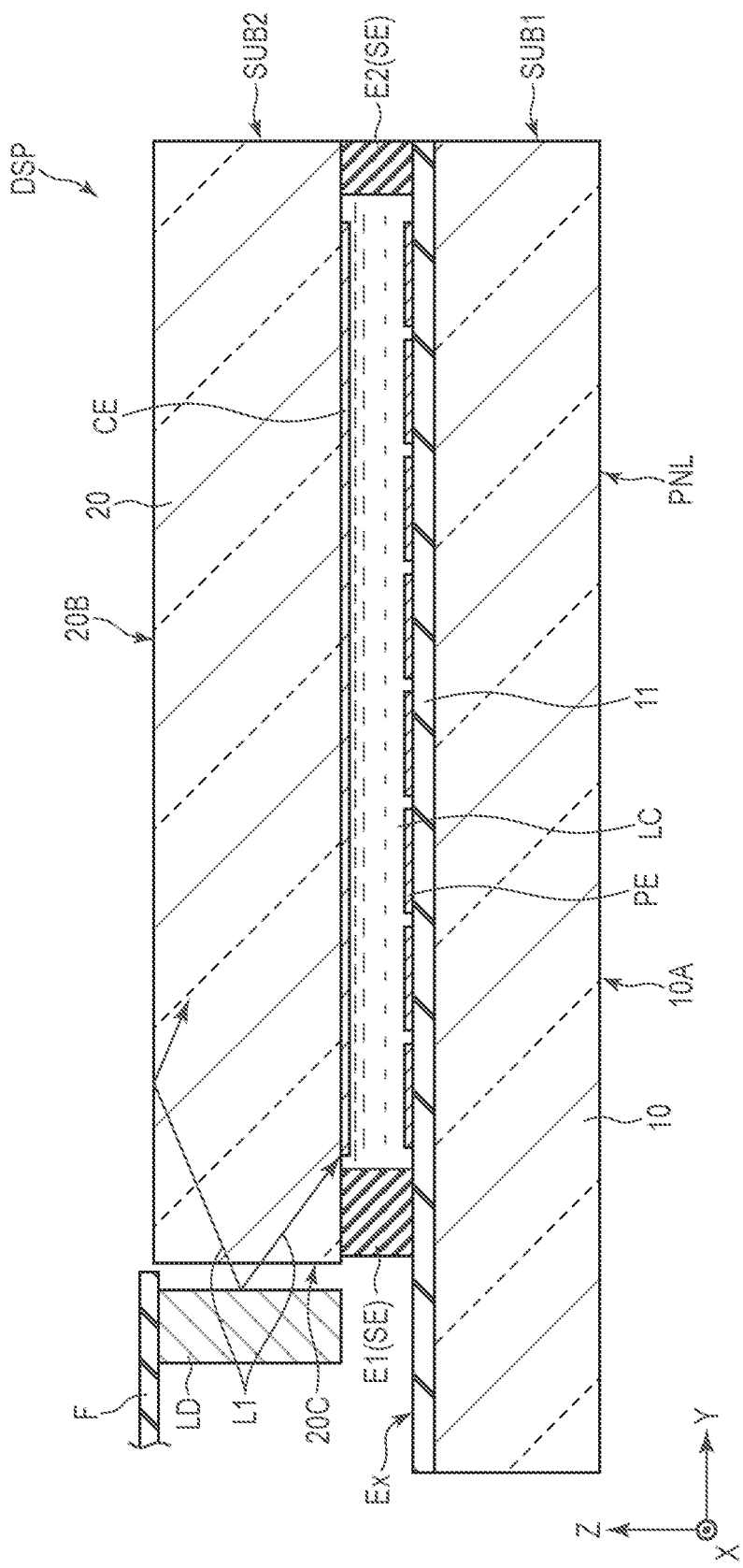
FIG. 3 is a cross-sectional view showing a configuration example of the transparent display.

FIG. 3 is a cross-sectional view showing a configuration example of the transparent display DSP of this embodiment. As to the display panel PNL, only main parts are illustrated.

The light-emitting devices LD oppose a side surface 20C of the transparent substrate 20 along the second direction Y. The light-emitting devices LD are electrically connected to the wiring substrate F. The light-emitting devices LD are, for example, light-emitting diodes, and include a red light emitting portion, a green light emitting portion, and a blue light emitting portion, though will not be described in detail. Note here that a transparent light guide may be disposed between the light-emitting devices LD and the side surface 20C.

Next, with reference to FIG. 3, light L1 emitted from the light-emitting devices LD will be described.

The light-emitting devices LD emit the light L1 toward the side surface 20C. The light L1 emitted from the light-emitting devices LD travels along a direction of an arrow indicating the second direction Y and enters the transparent substrate 20 from the side surface 20C. The light L1 entering the transparent substrate 20 travels inside the display panel PNL while being repeatedly reflected. The light L1 entering the liquid crystal layer LC while no voltage is applied thereto passes through the liquid crystal layer LC without being substantially scattered. Further, the light L1 entering the liquid crystal layer LC while voltage is applied thereto is scattered by the liquid crystal layer LC.

Next, the technology of mixed reality (hereinafter referred to as "MR") using the above-described transparent display DSP will now be described.

Figure 4:
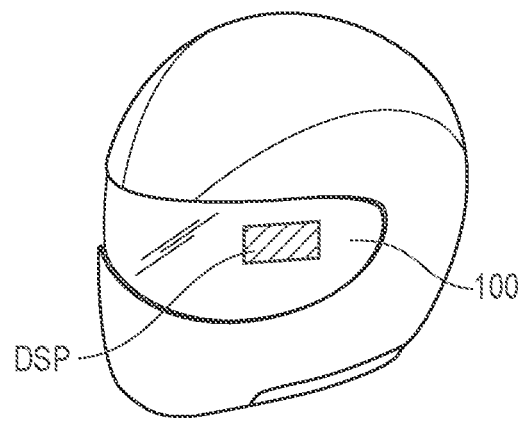
FIG. 4 is a diagram showing an application example of the display device of this embodiment.

As shown in, for example, FIG. 4, the transparent display DSP can be applied to a shield (visor) portion 100 of the helmet in order to realize the MR. In this case, the transparent display DSP displays, for example, vehicle information such as temperature and fuel consumption that needs to be checked while the vehicle or motorcycle is driven. As shown in FIG. 4, the transparent display DSP may be installed by attaching on an inner side (a user side) of the shield portion 100, or may be installed by hollowing out a part of the shield portion 100 and embedding it therein. The transparent display DSP should preferably be installed at a position opposing the user's eyes. More specifically, the transparent display DSP should preferably be installed in front of the user's line of sight when the user looks at the front (when looking straight ahead).

FIG. 4 illustrates a case where one transparent display DSP is installed only on one eye side of the user, but the embodiment is not limited to this. Two transparent displays DSP may be installed to correspond to the respective eyes of the user, or one transparent display DSP may be installed on the entire surface of the shield portion 100. The case where two transparent displays DSP are installed so as to correspond to the respective eyes of the user, and the case where one transparent display DSP is installed on the entire surface of the shield portion 100 will be described later.

Figure 5:
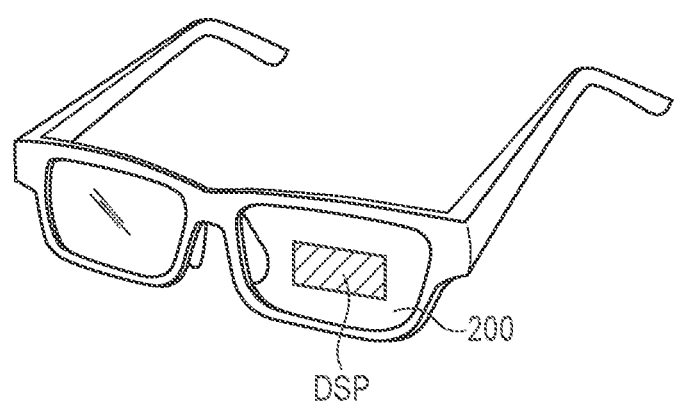
FIG. 5 is a diagram showing another application example of the display device of this embodiment.

Further, as shown in FIG. 5, for example, the transparent display DSP may be applied to a lens portion 200 of glasses in order to realize the MR. The position and environment where the transparent display DSP is installed on the lens portion 200 of the glasses are similar to those when the transparent display DSP is installed on the shield portion 100 of the helmet described above, and therefore a detailed description thereof will be omitted here.

As shown in FIGS. 4 and 5, the transparent display DSP is installed on the shield portion 100 of the helmet or the lens portion 200 of the glasses, that is, on the wearing tool, and thus the user can visually recognize the background (real world) through the shield 100 or the lens 200 while visually recognizing the information displayed on the transparent display DSP. Note that in FIGS. 4 and 5, the transparent display DSP may be configured to have a detachable structure.

On the other hand, when the transparent display DSP is installed on the shield portion 100 of the helmet or the lens portion 200 of the glasses, that is, when the transparent display DSP is installed in front of the user's eyes, the following problems may occur.

Figure 6:
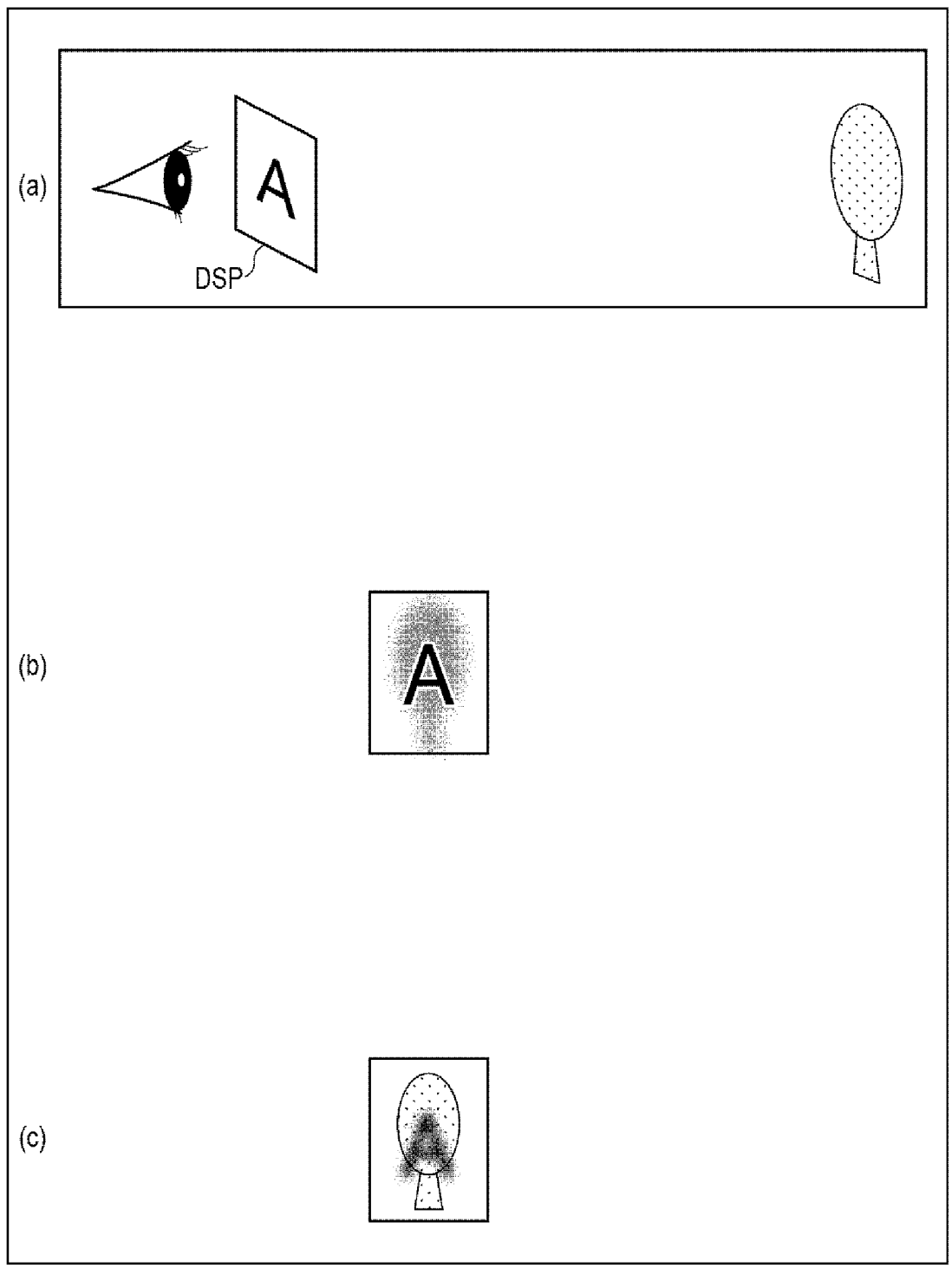
FIG. 6 is a diagram illustrating a problem that may occur when the transparent display is placed in front of the user's eyes.

FIG. 6 is a diagram illustrating a problem that may occur when the transparent display DSP is positioned in front of the user's eyes. FIG. 6 illustrates, in its part (a), an assumed case where a character "A" is displayed on the transparent display DSP, and there is one tree located within a visible range of the user and on a second surface side of the transparent display DSP(, which is farther than the transparent display DSP from the user's eyes). It should be noted that in the following description, the one tree mentioned above will be referred to as a "distant object" or a "background".

In the case shown in FIG. 6, when the user tries to visually recognize the character "A" displayed on the transparent display DSP, the user focuses on the transparent display DSP, and therefore as shown in FIG. 6, part (b), the character "A" displayed on the transparent display DSP can be clearly recognized. On the other hand, a distant object is not in focus, and therefore it causes such a problem that the distant object appears blurred.

Similarly, in the case shown in FIG. 6, when the user tries to visually recognize a distant object, the user focuses on the distant object, and therefore the distant object is clearly recognized as shown in FIG. 6, part (c). On the other hand, the transparent display DSP is not in focus, and therefore the character "A" displayed on the transparent display DSP appears blurred.

Here, the principle of the above-described problem will be explained with reference to FIG. 7.

Figure 7:
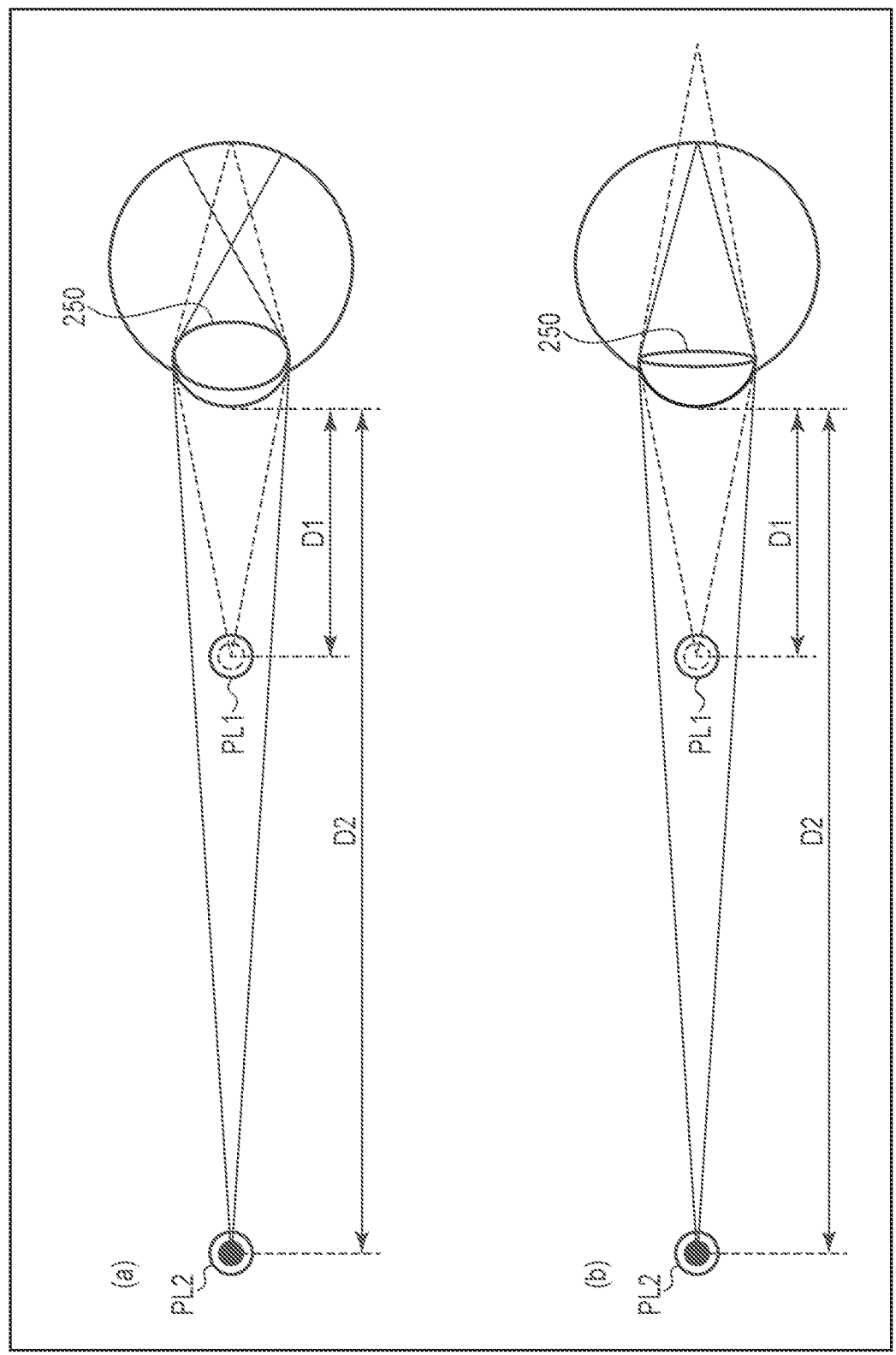
FIG. 7 is a diagram illustrating the principle of the problem shown in FIG. 6.

FIG. 7, part (a), illustrates a state where there are an object located a first distance D1 away from a human eye (to be referred to as a "near object", hereinafter) and another object located a second distance D2 away therefrom which is greater than the first distance D1 (to be referred to as a "distant object", hereinafter), and the near object is focused. Further, FIG. 7, part (b) illustrates a state where, of a near object and a distant object, the human eye focuses on the distant object. Note that the near object in FIG. 7 corresponds to the transparent display DSP shown in FIG. 6, and the distant object in FIG. 7 corresponds to the one tree (the distant object or background) shown in FIG. 6. Further, FIG. 7 will be described on the assumption that light emitted from the near object is identical to light emitted from a point light source PL1 located at the same place as that of the near object. Similarly, FIG. 7 will be described on the assumption that light emitted from the distant object is identical to light emitted from a point light source PL2 located at the same place as that of the distant object.

The crystalline lens that constitutes the human eye adjusts its thickness to increase when visually recognizing a near object, thus increasing the refractive index. Therefore, the light emitted from the point light source PL1 (light emitted from the near object) enters the human eye as shown by dotted lines in FIG. 7, part (a), is refracted by the crystalline lens 250, and then is incident on the retina to focus. On the other hand, when the light emitted from the point light source PL2 (light emitted from the distant object) enters the crystalline lens 250 in a state of a high refractive index in order to visually recognize a near object, the light is refracted by the crystalline lens 250 and then focused in front of the retina as indicated by solid lines in FIG. 7, part (a) because the refractive index of the crystalline lens 250 is excessively high for the light. Therefore, when a near object is focused, a distant object is not focused.

The crystalline lens that constitutes the human eye adjusts its thickness to decrease when visually recognizing a distant object, thus lowering the refractive index. Therefore, the light emitted from the point light source PL2 enters the human eye as shown by solid lines in FIG. 7, part (b), is gently refracted by the crystalline lens 250, and then is focused on the retina. On the other hand, when the light emitted from the point light source PL1 enters the crystalline lens 250 in a state of a low refractive index while trying to visually recognize a distant object, the light reaches the retina without being focused at the retina after being gently refracted by the crystalline lens 250 (virtually, it can be said that it is focused behind the retina) as shown by dotted lines in FIG. 7, part (b) because the refractive index of the crystalline lens 250 is excessively low for the light. Therefore, when a distant object is focused, a near object is not focused.

As described above, although it is possible to realize the MR by applying the transparent display DSP to a wearing device such as a helmet or glasses, if the transparent display DSP is installed in front of the user, the user cannot focus on information (near object) displayed on the transparent display DSP and a distant object located on the second surface side of the transparent display DSP at the same time, raising a problem that one of the objects appears blurred. Such a problem occurs. Hereinafter, a display device which can realize the MR by solving the above-described problems will be described.

Figure 8:
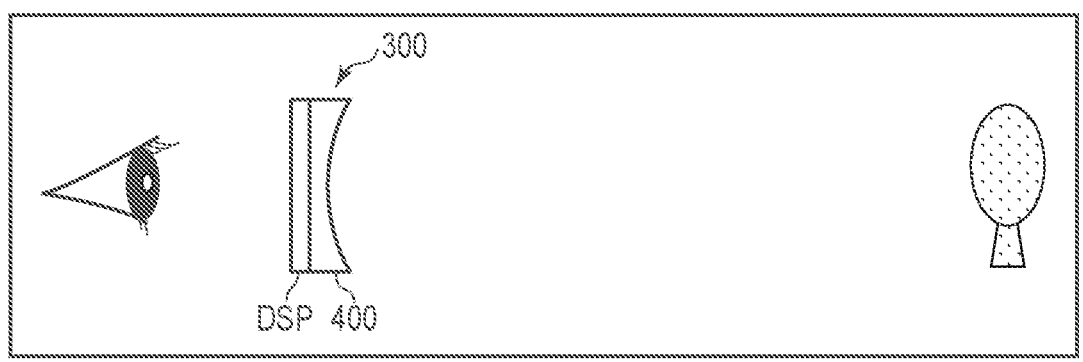
FIG. 8 is a diagram showing a configuration example of the display device of this embodiment.

FIG. 8 is a diagram showing a configuration example of the display device 300 of this embodiment. As shown in FIG. 8, the display device 300 according to this embodiment comprises a transparent display DSP and a first optical element 400 disposed on the second surface side of the transparent display DSP. The first optical element 400 is an element having characteristics (divergence characteristics) of diverging parallel light flux entering the first optical element 400, and is, for example, a concave lens or the like. The transparent display DSP and the first optical element 400 are adhered to each other with an adhesive made of, for example, a transparent resin. The adhesive should preferably have the same refractive index as that of the first optical element 400.

Although FIG. 8 shows an exemplified case where the transparent display DSP and the first optical element 400 are adhered together, the transparent display DSP and the first optical element 400 may be disposed with a space therebetween. Details of the case where the transparent display DSP and the first optical element 400 are disposed with an interval therebetween will be described later, and the details thereof will be omitted here. However, note that it is preferable in view of optical characteristics that the distance between the transparent display DSP and the first optical element 400 be a value approximated to zero.

Here, with reference to FIG. 9, a trace of light (optical path) will be described, in the case where the light emitted from the point light source PL2 (light emitted from a distant object) enters the crystalline lens 250 having a high refractive index via the display device 300 of this embodiment while trying to visually recognize a near object (the transparent display DSP).

Figure 9:
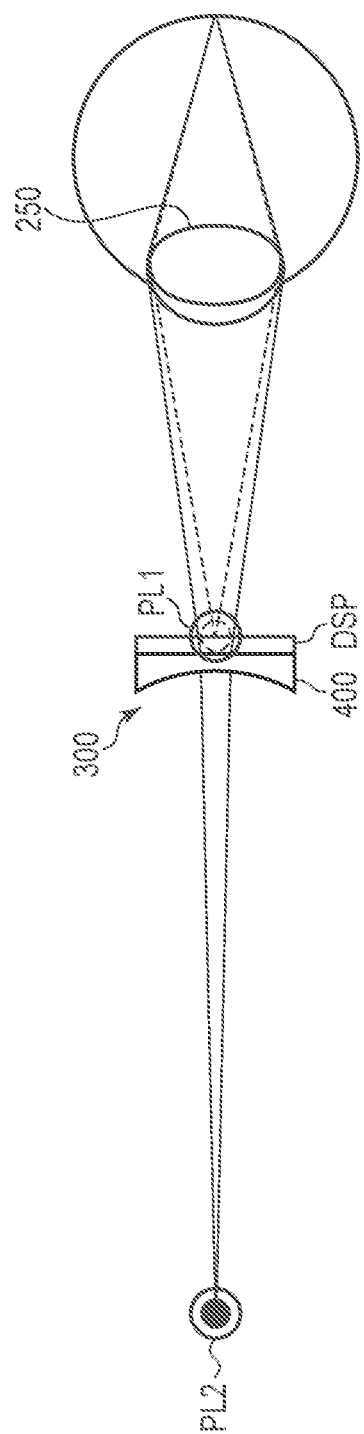
FIG. 9 is a diagram illustrating the principle that a near object and a distant object are simultaneously focused when the display device of this embodiment is employed.

In the case shown in FIG. 9, the light emitted from the point light source PL1 (the light emitted from the near object) draw a locus similar to the dotted lines in FIG. 7, part (a) described above, and is focused on the retina because the crystalline lens 250 is in a state of a high refractive index. On the other hand, the light emitted from the point light source PL2 is refracted in a direction in which it diverges by the first optical element 400 constituting the display device 300 and then enters the user's eye. Therefore, even the crystalline lens 250 is in a state of a high refractive index, the light is not focused in front of the retina, but it is focused on the retina as shown by the solid lines in FIG. 9 (or focused at a position closer to the retina than the position as indicated by the solid lines in FIG. 7, part (a)).

According to this, if the user focuses on a near object by trying to visually recognize the near object, it is also possible for the user to focus on a distant object as well by the function of the first optical element 400 that constitutes the display device 300. Therefore, as shown in FIG. 10, both the near object and the distant object can be clearly recognized (or it is possible to prevent the distant object from appearing blurry).

Figure 10:
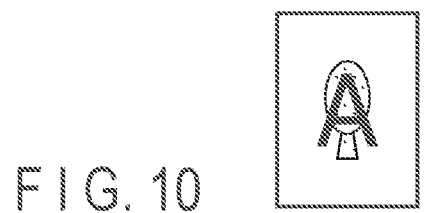
FIG. 10 is a diagram showing a near object and a distant object visually recognized by the user when the display device of the present embodiment is employed.

The display device 300 of this embodiment described above comprises the first optical element 400 having characteristics of diverging the entering light, and therefore as shown in FIGS. 9 and 10, the information displayed on the transparent display DSP, and the distant object located on the second surface side of the transparent display DSP can be focused at the same time, thus making it possible to prevent the occurrence of such an event that either one of the objects appears blurred.

Figure 11:
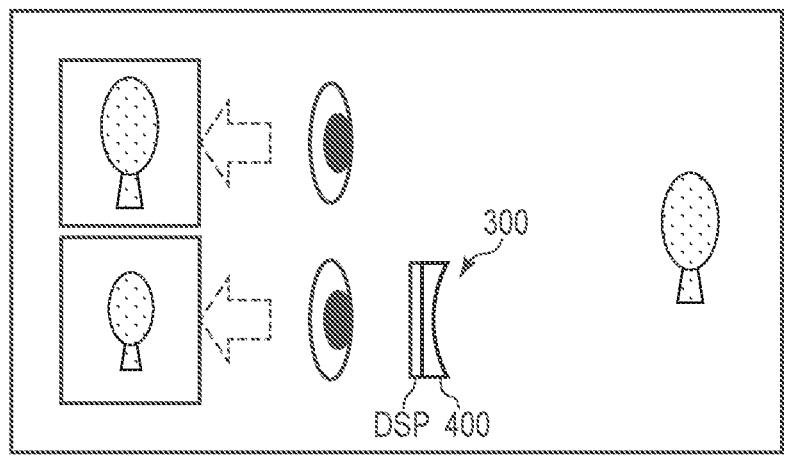
FIG. 11 is a diagram illustrating how the user sees when the display device of this embodiment is installed only on one eye of the user.

On the other hand, in the case of the display device 300 configured as illustrated in FIG. 9, the user visually recognizes a distant object via the first optical element 400, and therefore, due to the characteristics of the first optical element 400 (due to the change in viewing angle), the distant object appears smaller than when viewed with the naked eye as shown in FIG. 11. Therefore, when the display device 300 of this embodiment is installed only on one eye side of the shield portion 100 of the helmet or the lens portion 200 of the glasses as shown in FIGS. 4 and 5, the user visually recognizes the distant object with one eye through the display device 300 (the first optical element 400) and the distant object with the other eye not via the display device 300 (the first optical element 400), that is, for example, views with the naked eye as shown in FIG. 11. As a result, the size of the distant object appears to be different between the right eye and the left eye, which causes a visual difference. This is a stressful event for the user and is not very much desirable. Further, the crystalline lens of the one eye in FIG. 11 is in a state similar to that of as the crystalline lens 250 having the thickness and refractive index shown in FIG. 9, and the crystalline lens of the other eye is in a state similar to that of the crystalline lens 250 having the thickness and refractive index shown in FIG. 7, part (b). That is, the thickness of the crystalline lens differs between the right eye and the left eye, which is also an event that causes stress to the user. A display device which can realize MR after solving the above-described new problems will be described.

Figure 12:
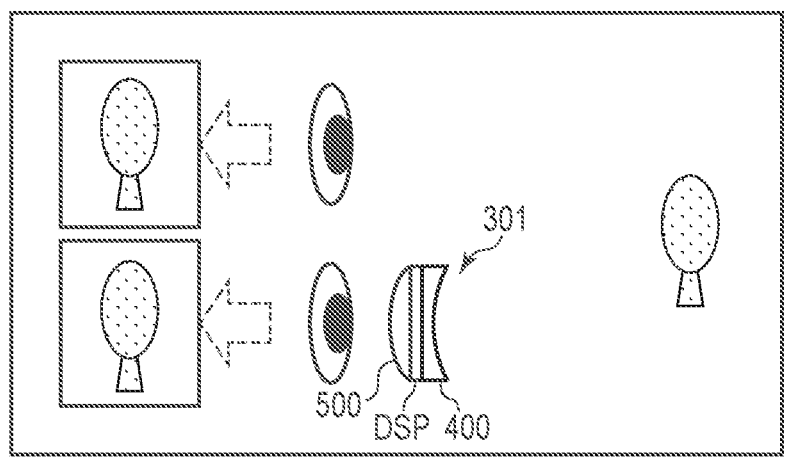
FIG. 12 is a diagram showing another configuration example of the display device of this embodiment.

FIG. 12 is a diagram showing a configuration example of the display device 301 of this embodiment. As shown in FIG. 12, the display device 301 according to this embodiment comprises a transparent display DSP, a first optical element 400 installed on the second surface side of the transparent display DSP and a second optical element 500 installed on a first surface side of the transparent display DSP. That is, the display device 301 is different from the display device 300 in that the display device 301 further includes the second optical element 500 on the first surface side of the transparent display DSP.

Unlike the first optical element 400, the second optical element 500 is an element having characteristics (condensing characteristic) of condensing a parallel light flux entering the second optical element 500 and is, for example, a convex lens or the like. The transparent display DSP and the first optical element 400 are adhered to each other with a first adhesive made of, for example, a transparent resin. The first adhesive should preferably have the same refractive index as that of the first optical element 400. Further, the transparent display DSP and the second optical element 500 are adhered with a second adhesive made of, for example, a transparent resin. The second adhesive should preferably have the same refractive index as that of the second optical element 500.

The first optical element 400 has characteristics of refracting light entering the first optical element 400 in a diverging direction, and therefore the first optical element 400 has a reduction effect of allowing the user to visually recognize an object smaller than its actual size. On the other hand, the second optical element 500 has characteristics of refracting light entering the second optical element 500 in a light-condensing direction, and therefore the second optical element 500 has an enlargement effect of allowing the user to visually recognize an object larger than its actual size. It is preferable that the display device 301 use a first optical element 400 (magnification: 1/x times) and a second optical element 500 (magnification: x times) such as of that the product of the magnifications of the two optical elements becomes 1.

Here, with reference to FIG. 13, a trace of light (optical path) will be described, in the case where the light emitted from the point light source PL1 (light emitted from a near object) and the light emitted from the point light source PL2 (light emitted from a distant object) enters the crystalline lens 250 in a state of a low refractive index via the display device 301 of this embodiment while trying to visually recognize the distant object.

Figure 13:
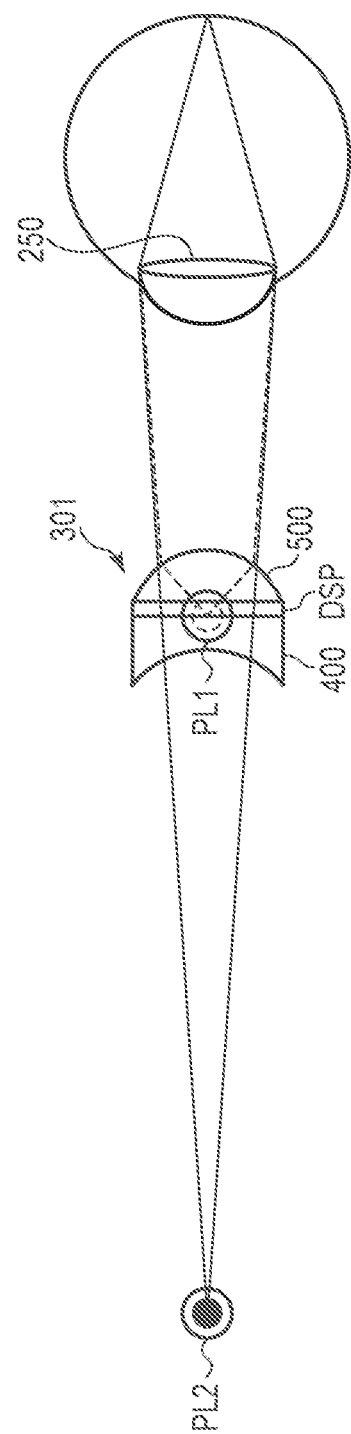
FIG. 13 is a diagram illustrating the principle that a near object and a distant object are simultaneously focused when the display device shown in FIG. 12 is employed.

In the case shown in FIG. 13, the light emitted from the point light source PL1 is refracted in the condensing direction by the second optical element 500 constituting the display device 301 and then enters the user's eye. Therefore, even when the crystalline lens 250 is in a state of a low refractive index, the light is focused on the retina as shown in FIG. 13 (or the position where the light is imaginary focused behind the retina is closer to the retina than the position shown in FIG. 7, part (b)), instead of reaching the retina without focusing as indicated by the dotted lines in FIG. 7, part (b). With this mechanism, although the user tries to visually recognize the distant object to focus on the distant object, the user can also focus on the near object by the function of the second optical element 500 constitutes the display device 301. Therefore, it is possible to clearly recognize both the near object and the distant object.

On the other hand, the light emitted from the point light source PL2 is refracted once in the diverging direction by the first optical element 400 constituting the display device 301, then refracted again in the condensing direction by the second optical element 500, and enters the eye. That is, the reduction effect created by the light-diverging characteristics of the first optical element 400 can be canceled by the enlargement effect created by the light-condensing characteristics of the second optical element 500. With this mechanism, the user can view a distant object at the same size even when viewed through the display device 301. Thus, when the distant object is viewed without intervening the display device 300 (the first optical element 400), it becomes possible to visually recognize the object by the same size as when viewed with, for example, the naked eye. Therefore, the above-described new problem can be solved.

Note that, as shown in FIG. 13, unlike the display device 300 described above, the display device 301 does not enable focusing on a distant object by focusing on a near object, but enables focusing on a near object as well by focusing on a distant object.

The display device 301 of this embodiment described above comprises the second optical element 500 that refracts light once refracted in the diverging direction by the first optical element 400 again in the condensing direction. Therefore, as shown in FIG. 13, the information displayed on the transparent display DSP and the distant object located on the second surface side of the transparent display DSP can be focused at the same time. Further, in either case where the distant object is viewed via the display device 301 or without intervening the display device 301 (the first optical element 400), that is, for example, when viewed with the naked eye, the object can be recognized as the same size. Thus, it is possible to prevent the occurrence of such an event that create a difference in vision between the two eyes.

The transparent display DSP and the first optical element 400 should preferably be adhered to each other and so should the transparent display DSP and the second optical element 500 as shown in FIGS. 12 and 13, but the configuration is not limited to this. Alternatively, that the transparent display DSP and the first optical element 400 may be installed with a space therebetween and so may the transparent display DSP and the second optical element 500. Hereinafter, with reference to FIG. 14, a display device 301*a* will be described, in which the transparent display DSP and the first optical element 400 are installed with a space therebetween and so are the transparent display DSP and the second optical element 500.

Figure 14:
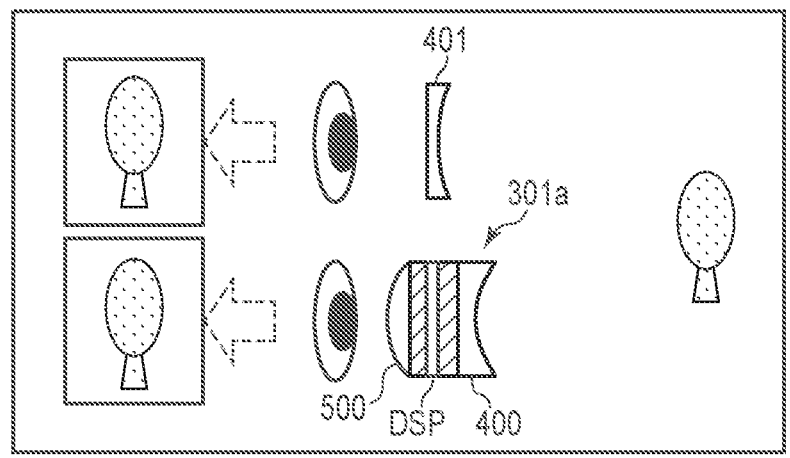
FIG. 14 is a figure which shows another configuration example of the display apparatus of this embodiment.

When the transparent display DSP and the first optical element 400 are installed with a space therebetween and so are the transparent display DSP and the second optical element 500 as shown in FIG. 14, there is a first air layer (corresponding to a shaded portion in FIG. 14) between the transparent display DSP and the first optical element 400, and there is a second air layer (corresponding to another shaded portion in FIG. 14) between the transparent display DSP and the second optical element 500. With regard to the first and second air layers, for example, the following problems may occur.

In the display device 301 having the configuration shown in FIGS. 12 and 13, light emitted from a distant object is refracted once in the diverging direction by the first optical element 400, and then the light is refracted again in the condensing direction by the second optical element 500. Thus, the reduction effect caused by the characteristics of the first optical element 400 is canceled by the enlargement effect caused by the characteristics of the second optical element 500. As a result, even if the user views through the display device 301, it is possible to visually recognize a distant object with the same size as when viewed without the display device 301 (the first optical element 400) or viewed with the naked eye.

On the other hand, in the case of the display device 301*a* having the configuration shown in FIG. 14, light emitted from a distant object is refracted once in the diverging direction by the first optical element 400 and then the light is refracted again in the light-condensing direction by the second optical element 500, as in the case of the display device 301. However, due to the first and second air layers, a reduction effect greater than that caused by the characteristics of the first optical element 400 may occur. As a result, the above-described reduction effect cannot be canceled out by the enlargement effect caused by the characteristics of the second optical element 500, thereby creating a problem that there is a visual difference between the right eye and the left eye.

To avoid this, when the display device 301*a* having the configuration shown in FIG. 14 is used, a third optical element 401 (correction lens) having the same characteristics as those of the first optical element 400 is installed at a position facing the eye opposite to the eye facing the display device 301*a* in the shield portion 100 of the helmet or the lens portion 200 of the glasses.

As in the case of the first optical element 400, the third optical element 401 is an element having characteristics of refracting entering light in a diverging direction, and has a reduction effect that makes the user visually perceive an object smaller than its actual size. When both the first and third optical elements 400 and 401 are concave lenses, the third optical element 401 has a larger curvature (that is, a magnification) than that of the first optical element 400. The magnification of the third optical element 401 is set on the basis of how much smaller the user visually recognizes a distant object the actual size of the object when viewed through the display device 301*a*. For example, when the object is visually recognized by 1/x times, it is set to 1/x times. That is, the third optical element 401 has a reduction effect that cannot be canceled by the enlargement effect caused by the characteristics of the second optical element 500 described above.

With this structure, when the user visually recognizes a distant object through the display device 301*a*, the size of the distant object is visually recognized to be smaller than the actual size, but the object can be recognized similarly smaller by the other eye through the third optical element 401. Thus, it is possible to suppress the occurrence of such an event that there is a visual difference created between the right eye and the left eye.

Note that, here, as a method of solving the problem that occurs when the display device 301*a* is employed, in which the transparent display DSP and the first optical element 400 are installed with a space therebetween and so are the transparent display DSP and the second optical element 500, the method of installing the third optical element 401 at a position facing the eye opposite to the eye facing the display device 301*a* is described. But the method for solving the above-described problem is not limited to this.

Figure 15:
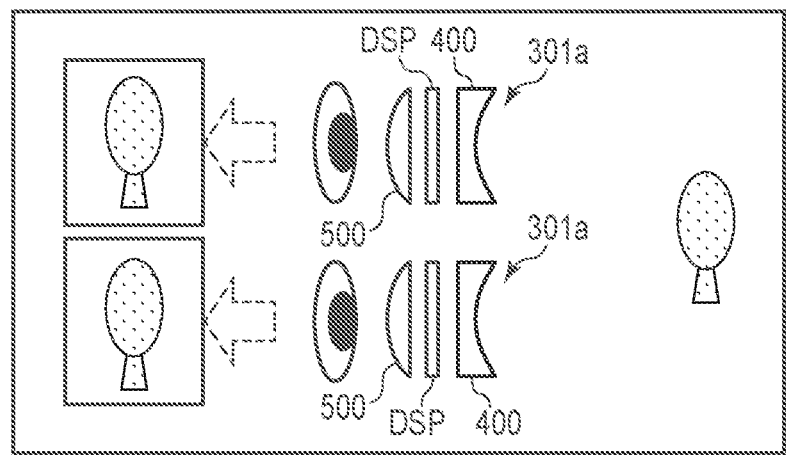
FIG. 15 is a diagram illustrating a method of applying the display device shown in FIG. 14.

For example, as shown in FIG. 15, another display device 301*a* may be installed in place of the third optical element 401. In this case, the display device 301*a* for the right eye and the display device 301*a* for the left eye are installed in the shield portion 100 of the helmet and the lens portion 200 of the glasses, and therefore there is no visual difference between the right eye and the left eye, thereby making it possible to solve the above-described problem. Note that when an image is displayed on the display device 301a for the right eye, no image is displayed on the display device 301a for the left eye. Similarly, when an image is displayed on the display device 301a for the left eye, no image is displayed on the display device 301a for the right eye.

Alternatively, as shown in FIG. 16, a display device 301a having a size corresponding to both the right eye and the left eye may be installed on the entire surface of the shield portion 100 (or the lens portion 200 of the glasses) of the helmet. In this case, the user visually recognizes a distant object through both the right eye and the left eye through the single display device 301a, and thus a visual difference between the right eye and the left eye is not created, thus making it possible to solve the above-described problem. Here, when an image is displayed in a region facing the right eye of the display device 301a, no image is displayed in a region facing the left eye of the display device 301a. Similarly, when the image is displayed in the region facing the left eye of the display device 301a, the image is not displayed in the region facing the right eye of the display device 301a.

Note, as shown in FIG. 17, the display device 301a may further comprise an adjusting mechanism 600 which can adjust the distance between the transparent display DSP and the first optical element 400 and the distance between the transparent display DSP and the second optical element 500. FIG. 17 shows such an adjusting mechanism 600 comprising at least two shafts 601 that connect the respective units 300 to 500 and a plurality of screws 602 that allow the portions 300 to 500 to move in the left-right direction along the two shafts 601. Note that the configuration of the adjusting mechanism 600 is not limited to this, but it has any configuration as long as the transparent display DSP, the first optical element 400, and the second optical element 500 can be moved in the left-right direction and the units 300 to 500 can be fixed. With such a structure, it is possible to cope with the difference in the vision resulting by the difference in eyesight between users, and it is possible to provide appropriate visions to various users whose eyesight differ from one another.

When the display device 301a including the adjusting mechanism 600 is applied to the helmet shown in FIG. 4, the distance from the user's eyes to the transparent display DSP should preferably be about 5 cm to 15 cm. Here, the distance between the transparent display DSP and the first optical element 400 and the distance between the transparent display DSP and the second optical element 500 can be adjusted to 0 cm to 3 cm, respectively, by the adjustment mechanism 600. Similarly, when the display device 301a including the adjustment mechanism 600 is applied to the glasses illustrated in FIG. 5, the distance from the user's eyes to the transparent display DSP should preferably be about 2 cm to 5 cm. In this case as well, it is assumed that the distance between the transparent display DSP and the first optical element 400 and the distance between the transparent display DSP and the second optical element 500 can be adjusted to 0 cm to 3 cm, respectively, by the mechanism 600.

This embodiment is described on the assumption that the first optical element 400 is a concave lens and the second optical element 500 is a convex lens, but the embodiment invention is not limited to this. As the first optical element 400 and the second optical element 500, a liquid crystal lens, which is a kind of variable focus lens, may be used for each.

Figure 18:
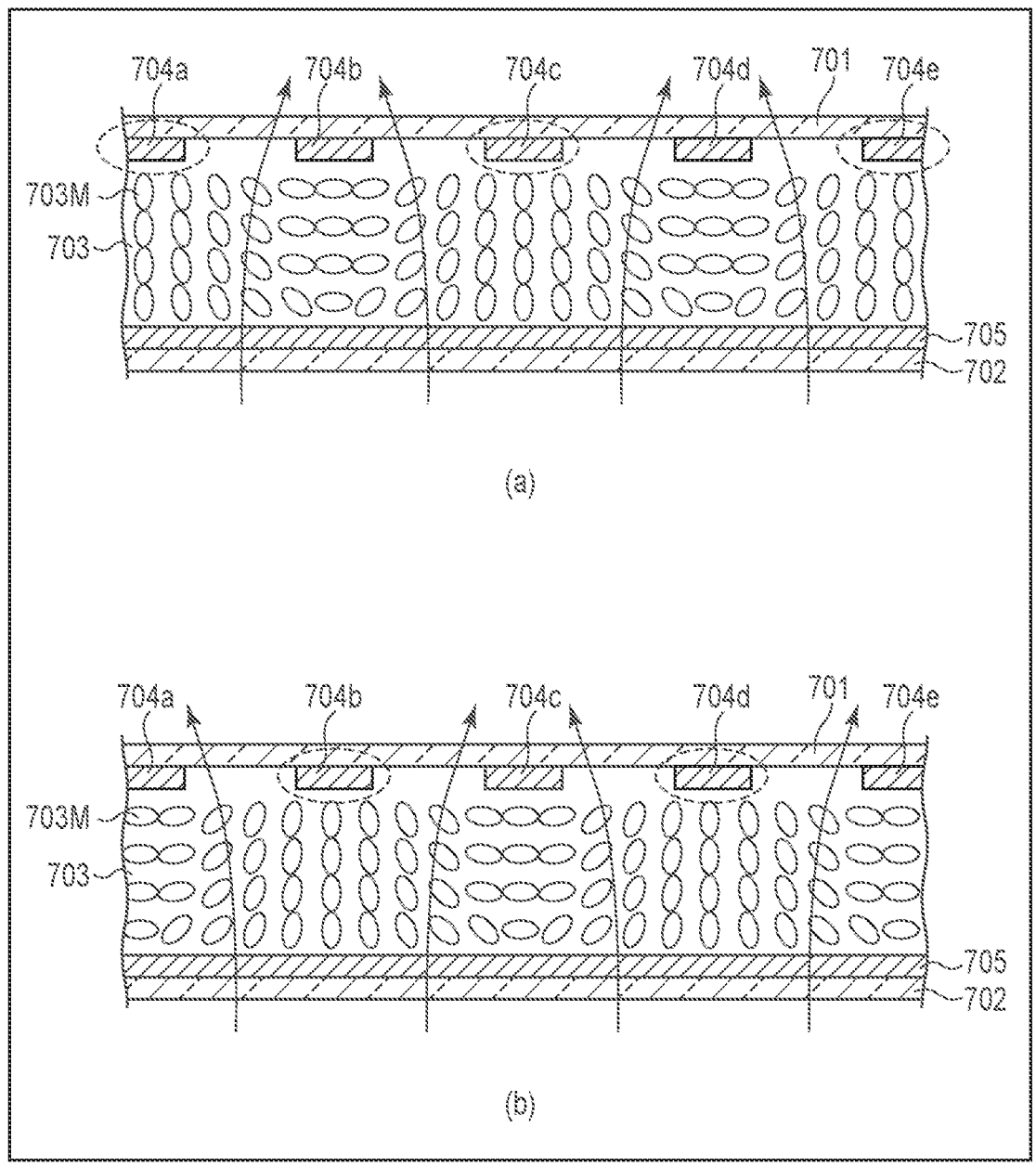
FIG. 18 is a diagram illustrating a liquid crystal lens.

FIG. 18 is a diagram illustrating an example of a liquid crystal lens 700.

As shown in FIG. 18, the liquid crystal lens 700 comprises a first substrate 701, a second substrate 702, a liquid crystal layer 703, a plurality of first control electrodes 704, and a second control electrode 705. In the example illustrated, the first control electrode 704 is provided on the first substrate 701 and the second control electrode 705 is provided on the second substrate 702, but both the first control electrode 704 and the second control electrode 705 are provided on the same substrate, that is, the first substrate 701 or the second substrate 702.

The first control electrodes 704 are arranged on the first substrate 701 at intervals along the first direction X. For example, the width of the first control electrodes 704 along the first direction X is equal to or less than the distance between each adjacent pair of first control electrodes 704 along the first direction X. The first control electrodes 704 are covered by an alignment film (not shown), and the alignment film is in contact with the liquid crystal layer 703.

The second control electrode 705 is a single plate electrode and faces the first control electrodes 704 via the liquid crystal layer 703. As in the case of the first control electrodes 704, the second control electrode 705 is covered by an alignment film (not shown), and the alignment film is in contact with the liquid crystal layer 703. That is, the liquid crystal layer 703 is sandwiched by the alignment film that covers the first control electrodes 704 and the alignment film that covers the second control electrode 705.

The first substrate 701 and the second substrate 702 are, for example, glass substrates or resin substrates. The first control electrode 704 and the second control electrode 705 are made of a transparent conductive material such as indium tin oxide (ITO) or indium zinc oxide (IZO). The liquid crystal layer 703 is formed of, for example, a liquid crystal material having a positive dielectric anisotropy. The first control electrode 704 and the second control electrode 705 apply a voltage for forming a lens to the liquid crystal layer 703.

As described above, the liquid crystal layer 703 has a positive dielectric anisotropy, and liquid crystal molecules 703M contained in the liquid crystal layer 703 have their major axes aligned along the first direction X when no electric field is formed. In the state where an electric field is formed, the major axes are aligned along the electric field.

When a voltage equal to or higher than the threshold value is alternately applied to the first control electrodes 704 arranged at equal intervals, an electric field is formed, and a refractive index distribution according to the alignment state of the liquid crystal molecules 703M is created in the liquid crystal layer 703. More specifically, when a voltage equal to or higher than the threshold value is applied to first control electrodes 704a, 704c and 704e, a convex lens-shaped refractive index distribution (in other words, a refractive index distribution having light-condensing characteristics) is created as shown in FIG. 18, part (a), whereas when a voltage equal to or higher than the threshold is applied to first control electrodes 704b and 704d, a concave lens-shaped refractive index distribution (in other words, a refractive index distribution having light-diverging characteristics) is created as shown in FIG. 18, part (b).

As described above, the liquid crystal lens 700 functions as both the first optical element 400 having divergent characteristics and the second optical element 500 having condensing characteristics, depending on how the voltage is applied to the first control electrodes 704. Thus, the display devices 300, 301 and 301a may be configured by using the liquid crystal lens 700 in the state shown in FIG. 18, part (b) in place of the first optical element 400 and using the liquid crystal lens 700 in the state shown in FIG. 18, part (a) in place of the second optical element 500.

Note that the liquid crystal lens 700 is a variable focal length lens which adjust its focal length according to the magnitude of the voltage applied, and therefore, as in the case where the adjusting mechanism 600 described above is provided, it is possible to cope with the difference in the vision resulting by the difference in eyesight between users, and it is possible to provide appropriate visions to various users whose eyesight differ from one another.

This embodiment is described on the assumption that the display devices 301 and 301*a* each comprise one first optical element 400 and one second optical element 500 in addition to the transparent display DSP, but the configurations of the display devices 301 and 301*a* are not limited to this. The display devices 301 and 301*a* may comprise, for example, a plurality of first optical elements 400 and one second optical element 500 in addition to the transparent display DSP. Hereinafter, a case where the display devices 301 and 301*a* each comprise a plurality of first optical elements 400 will be described in detail.

For example, when the display devices 301 and 301*a* are installed on the shield portion 100 of the helmet, it is assumed that the user visually recognizes a road, a vehicle body, a person, etc., located in the traveling direction as distant objects in the upper region of the display devices 301 and 301*a*, whereas in the lower region of the display devices 301 and 301*a*, various types of instruments such as a tachometer and a car navigation system are visually recognized as distant objects. That is, the distance to the object visually recognized as a distant object may differ between the upper area and the lower area in each of the display device 301 and 301*a*. In such a case, with one type of the first optical element 400, it is easy to visually recognize a distant object in the upper region in each of the display devices 301 and 301*a* (easy to focus), whereas it is difficult to visually recognize a distant object in the lower region in each of the display devices 301 and 301*a* (difficult to focus). Thus, appropriate visions for the user cannot be provided.

Figure 19:
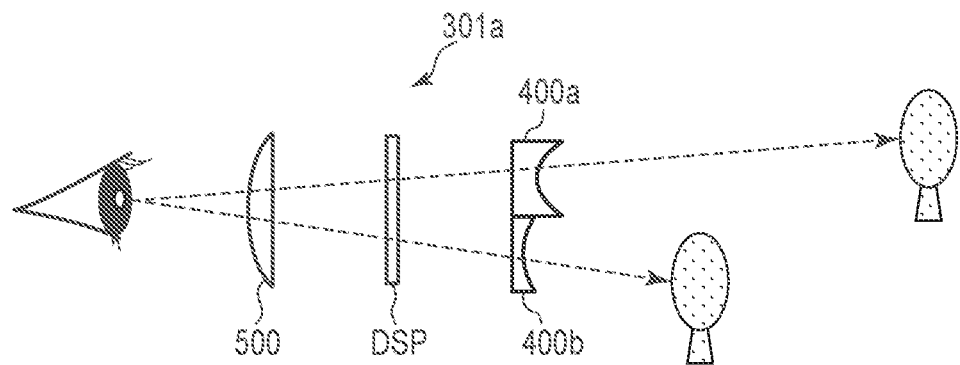
FIG. 19 is a diagram showing still another configuration example of the display device of this embodiment.

In order to solve such a problem, as shown in FIG. 19, the display devices 301 and 301*a* may be provided with a first optical element 400*a* installed in the upper region of the second surface side of the transparent display DSP and a first optical element 400*b* installed in the lower region of the second surface side of the transparent display DSP and having a refractive index different from that of the first optical element 400*a*. Note that, for convenience of description, FIG. 19 illustrates the display device 301*a* in which the transparent display DSP and the first optical element 400 are installed with a space therebetween and so are the transparent display DSP and the second optical element 500. But naturally, a similar structure may be applicable even for the display device 301 in which the transparent display DSP, the first optical element 400 and the second optical element 500 are installed while being adhered together. Furthermore, in FIG. 19, one second optical element 500 is installed, but a plurality of second optical elements 500 may be installed. For example, two second optical elements 500 may be installed one at a position facing the first optical element 400*a* and the other at a position facing the first optical element 400*b*.

In FIG. 19, it is assumed that the object viewed by the user as a distant object in the upper area is located farther than the object viewed as a distant object in the lower area. Therefore, the first optical element 400*a* having a low refractive index is installed in the upper area, and the first optical element 400*b* having a refractive index higher than that of the first optical element 400*a* is installed in the lower area.

Note, here, the case where the first optical element 400*a* having a low refractive index is installed in the upper region and the first optical element 400*b* having a high refractive index is installed in the lower region is described, but in which region the first optical element 400 should be installed, or what refractive index should the first optical element 400 has can be arbitrarily changed according to the situation. For example, when an object viewed by the user as a distant object in the upper region is located closer than an object viewed as a distant object in the lower region, the first optical element 400*b* having a high refractive index may be installed in the upper region, and the first optical element 400*a* having a low refractive index may be installed in the lower region.

Here, the case where two optical elements 400 are installed is described, where the display devices 301 and 301*a* are virtually divided into two regions such as an upper region and a lower region by one horizontal line, and the two optical elements 400 having different refractive indexes are installed in the upper region and the lower region, respectively. Note that the number of regions where the first optical element 400 is installed and the number of the first optical elements 400 to be installed can be arbitrarily changed according to the situation. For example, the display devices 301 and 301*a* are divided into three by two horizontal lines, and are virtually divided into three regions such as an upper region, a middle region, and a lower region, and one first optical element 400 may be installed in each region.

As described above, the display devices 301 and 301*a* configured as shown in FIG. 19 comprise the first optical element 400*a* installed in the upper area on the second surface side of the transparent display DSP and the first optical element 400*b* installed in the lower region on the second surface side of the transparent display DSP and having a refractive index different from that of the first optical element 400*a*. With this structure, even if the distance to the object visually recognized as a distant object differs between the upper region and the lower region in each of the display devices 301 and 301*a*, it is possible to allow the user to clearly recognize the object visually recognized as a distant object in both the upper region and the lower region.

Figure 20:
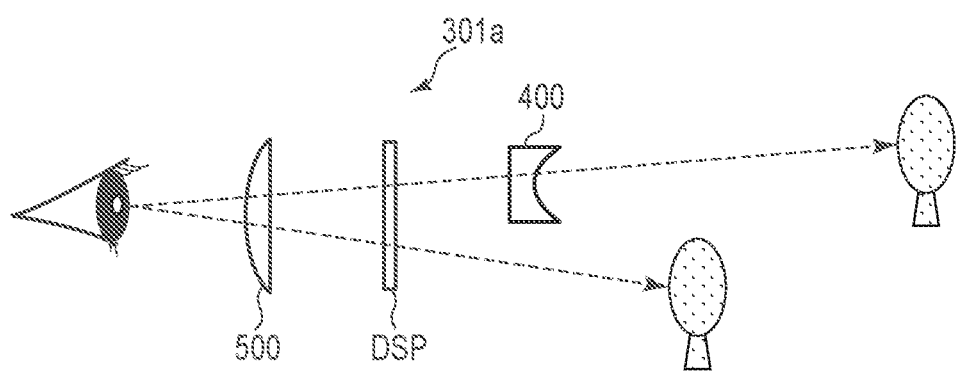
FIG. 20 is a diagram showing still another configuration example of the display device of this embodiment.

In the case show in in FIG. 19 described above, the first optical element 400*a* is installed in the upper regions of the display devices 301 and 301*a*, and the first optical element 400*b* is installed in the lower regions of the display devices 301 and 301*a*. With this structure, even when the distance to the object visually recognized by the user as a distant object differ from one region to another, it is possible to provide the user with appropriate visions. But as shown in FIG. 20, for example, the first optical element 400 is installed only in the upper regions of the display device 301 and 301*a*, whereas the first optical element 400 is not installed in the lower regions of the display devices 301 and 301*a*. With such a structure, it is also possible to solve the above-described problems and provide the user with appropriate visions.

Figure 21:
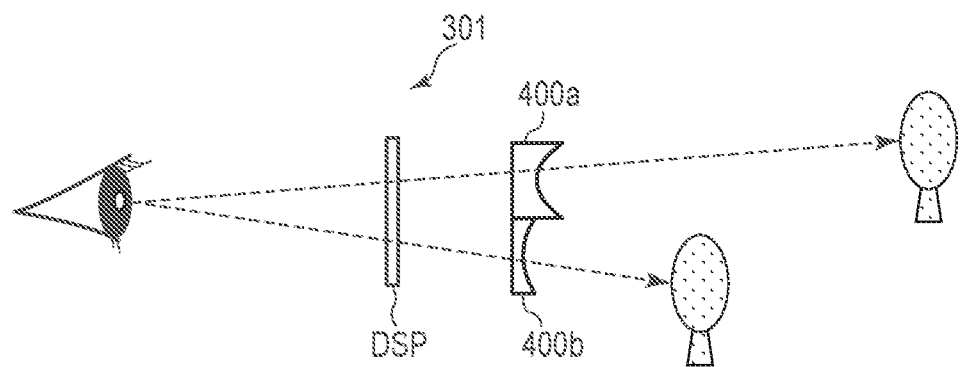
FIG. 21 is a diagram showing still another configuration example of the display device of this embodiment.

Further, in the case shown in FIG. 19 described above, a case where a plurality of first optical elements 400 are applied to the display devices 301 and 301*a* comprising the transparent display DSP, the first optical element 400 and the second optical element 500 is described. But as shown in FIG. 21, for example, a plurality of first optical elements 400 may be applied to the display device 300 comprising the transparent display DSP and the first optical element 400. Even in this case, as in the case of the configurations shown in FIGS. 19 and 20, it is possible to solve the above-described problems and provide the user with appropriate visions.

Figure 22:
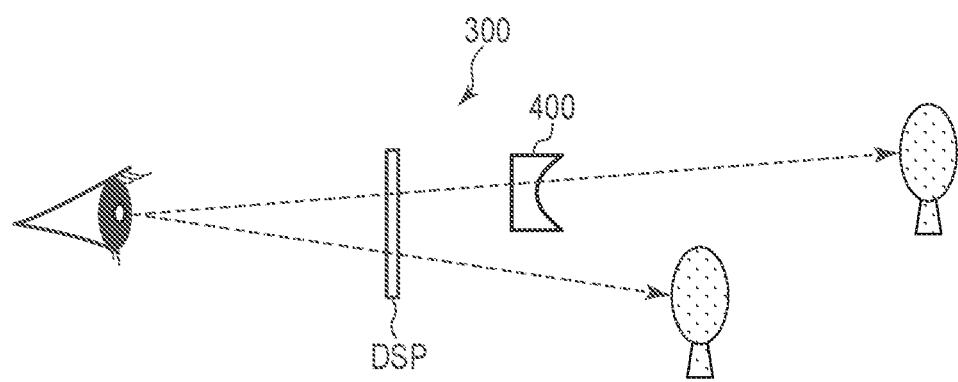
FIG. 22 is a diagram showing still another configuration example of the display device of this embodiment.

Further, FIG. 21 illustrates the example case where the first optical element 400a is installed in the upper region of the display device 300 and the first optical element 400b is installed in the lower region of the display device 300. But as shown in FIG. 22, for example, the first optical element 400 is installed only in the upper area of the display device 300, and the first optical element 400 is not installed in the lower area of the display device 300. With this structure, it is possible to solve the above-described problems and provide appropriate visions for the user.

FIGS. 19 to 22 provided above illustrate the cases where the distance to the object visually recognized by the user as a distant object differs between the upper region and the lower region of the display device, that is, the distance differs between the up and down directions of the display device. Hereinafter, a case will be described in which the distance to the object visually recognized by the user as a distant object differs between the left and right directions of the display device. The following description is provided on the assumption that the display device is divided into three by two vertical lines and is virtually divided into three regions such as a central region, a left region and a right region.

For example, when the display devices 301 and 301a are installed on the shield portion 100 of the helmet, the user views, in the central regions in each of the display devices 301 and 301a, a roadway, a vehicle body, a person on the roadway, etc., located in the traveling direction as distant objects. On the other hand, in the left and right regions of each of the display devices 301 and 301a, it is presumed that a sidewalk, a guardrail, a person on the sidewalk, etc., located in the traveling direction are visually recognized as distant objects. That is, the distance to the object visually recognized as a distant object may differ between the central region and the left and right regions in each of the display devices 301 and 301a. In such a case, with one type of the first optical element 400, it is easy to visually recognize a distant object (focus is easy) in the central regions of the display devices 301 and 301a, whereas it is difficult to visually recognize a distant object (difficult to focus) in the left and right regions of each of the display devices 301 and 301a. Thus, it may not be possible to provide clear visions.

Figure 23:
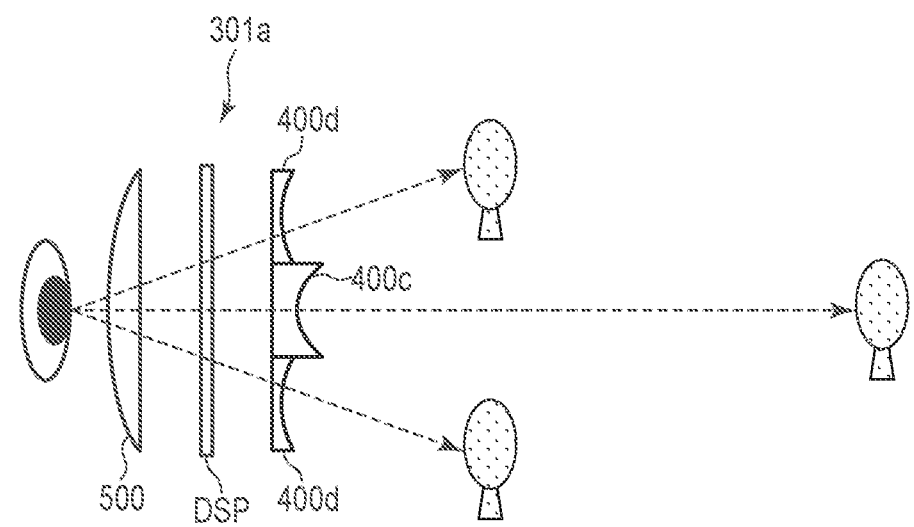
FIG. 23 is a diagram showing still another configuration example of the display device of this embodiment.

In order to solve such a problem, as shown in FIG. 23, the display devices 301 and 301a may comprise the first optical element 400c installed in the central region of the second surface side of the transparent display DSP and first optical elements 400d respectively installed in the left and right regions of the second surface side of the transparent display DSP and having a refractive index different from that of the first optical element 400c. Note that, for the sake of convenience of description, FIG. 23 illustrates a display device 301a in which the transparent display DSP and the first optical element 400 are installed with a space therebetween and so are the transparent display DSP and the second optical element 500. But naturally, a similar structure may be applicable even for the display device 301 in which the transparent display DSP, the first optical element 400 and the second optical element 500 are installed while being adhered together. Furthermore, in FIG. 23, one second optical element 500 is installed, but a plurality of second optical elements 500 may be installed. Note that FIG. 23 is a diagram showing the user and the display device as viewed from directly above.

In FIG. 23, it is assumed that the object viewed by the user as a distant object in the central region is located farther than the object viewed as a distant object in the left and right regions. Therefore, the first optical element 400c having a low refractive index is installed in the central region, and the first optical elements 400d having a refractive index higher than that of the first optical element 400c are installed in the left and right regions, respectively.

Here, the case is described, where the first optical element 400c having a low refractive index is installed in the central region and the first optical elements 400d having a high refractive index is installed respectively in the left and right regions. But in which region the first optical element 400 should be installed, or what refractive index should the first optical element 400 has can be arbitrarily changed according to the situation.

For example, when the distance to the object visually recognized by the user as a distant object is located farther in the order of the central region, the right region and the left region, the first optical element 400c having the lowest refractive index may be installed in the central region, the first optical element 400da having the highest refractive index may be installed in the left area, and the first optical element 400db having a refractive index higher than that of the first optical element 400c but lower than that of the first optical element 400da may be installed in the right region as shown in FIG. 24. Further, for example, when the distance to the object visually recognized by the user as a distant object is located farther in the order of the central region, the left region, and the right region, the first optical element 400c having the lowest refractive index may be installed in the central region, the first optical element 400da having the highest refractive index may be installed in the right area, and the first optical element 400db having a refractive index higher than that of the first optical element 400c but lower than that of the first optical element 400da may be installed in the left region as shown in FIG. 25.

Here, the case where three optical elements 400 are installed is described, where the display devices 301 and 301a are virtually divided into three regions such as a central region and right and left regions by tow vertical lines, and the three optical elements 400 having different refractive indexes are installed in the central region and the right and left regions, respectively. Note that the number of regions where the first optical element 400 is installed and the number of the first optical elements 400 to be installed can be arbitrarily changed according to the situation. For example, the display devices 301 and 301a are divided into four by three vertical lines, and are virtually divided into four regions such as a left-central region, a right-central region, a left region and a right region, and one first optical element 400 may be installed in each region.

As described above, the display devices 301 and 301a configured as shown in FIGS. 23 to 25 comprise the first optical element 400c installed in the central region on the second surface side of the transparent display DSP and first optical elements 400d respectively installed in the left and right regions on the second surface side of the transparent display DSP and having a refractive index different from that of the first optical element 400c. With this structure, even if the distance to the object visually recognized as a distant object differs between the central region and the left and right regions in each of the display devices 301 and 301a, it is possible to allow the user to clearly recognize it as a distant object in any region.

Figure 26:
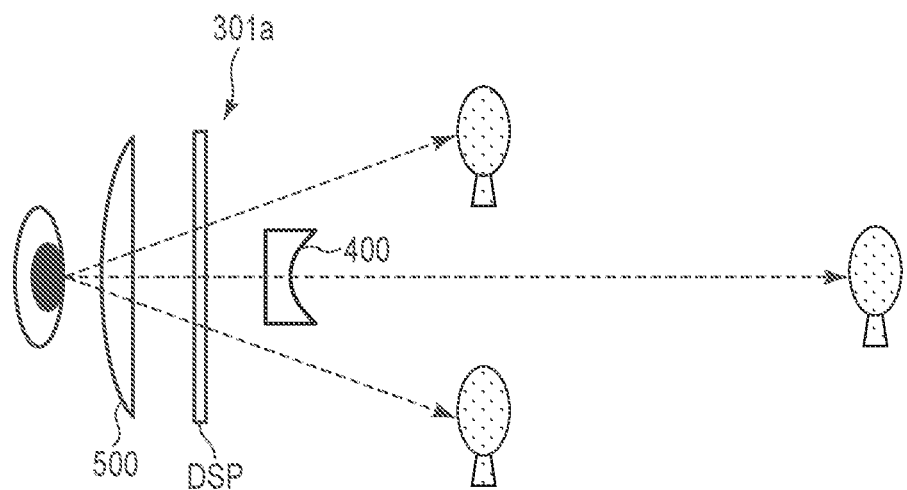
FIG. 26 is a diagram showing still another configuration example of the display device of this embodiment.

FIGS. 23 to 25 described above illustrate that appropriate visions can be provided for the user even in the case where the distance to the object visually recognized as a distant object differs from one region to another as the first optical element 400c is installed in the central areas of the display devices 301 and 301a, and the first optical elements 400d are respectively installed in the left and right regions in each of the display devices 301 and 301a. But as shown in FIG. 26, for example, the first optical element 400 may be installed only in the central region and the first optical elements 400 may not be installed in the left and right regions in each of the display devices 301 and 301a, thereby solving the above-described problems and making it possible to provide appropriate visions for the user.

Figure 27:
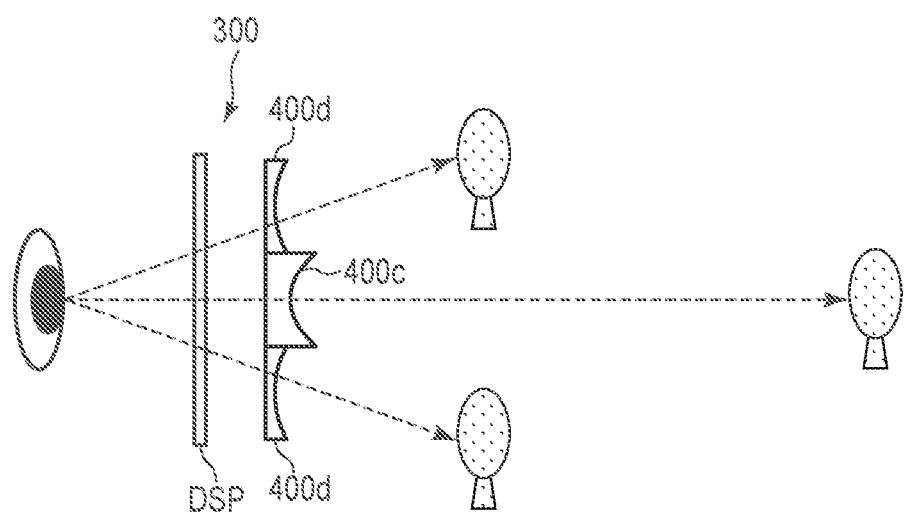
FIG. 27 is a diagram showing still another configuration example of the display device of this embodiment.

Further, FIGS. 23 to 25 described above illustrate the cases where a plurality of first optical elements 400 are applied to the display devices 301 and 301a comprising the transparent display DSP, the first optical element 400 and the second optical element 500. But as shown in FIG. 27, for example, a plurality of first optical elements 400 may be applied to the display device 300 comprising the transparent display DSP and the first optical element 400. In this case as well, as in the case of the configurations shown in FIGS. 23 to 25 described above, it is possible to solve the above-described problems and provide appropriate visions for the user.

Figure 28:
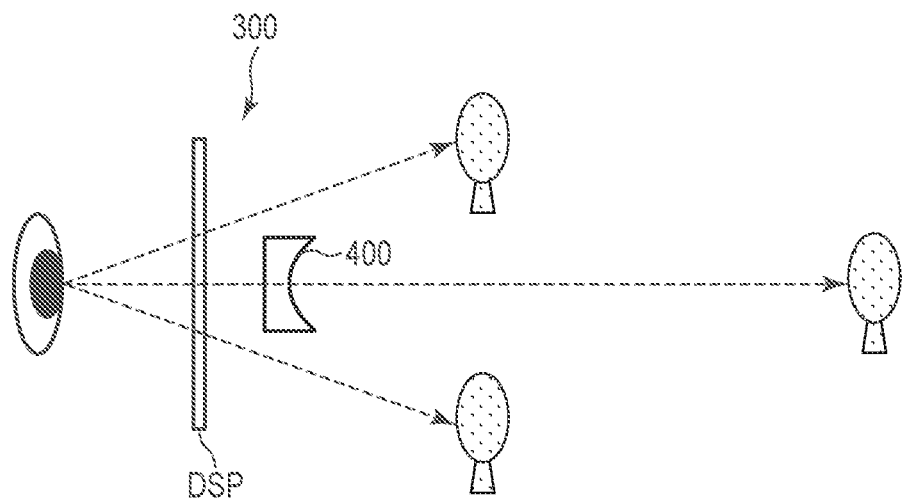
FIG. 28 is a diagram showing still another configuration example of the display device of this embodiment.

Further, FIG. 27 illustrates the example case where the first optical element 400c is installed in the central region of the display device 300 and the first optical elements 400d are installed in the left and right regions of the display device 300. But as shown in FIG. 28, for example, the first optical element 400 may be installed only in the central region of the display device 300 and the first optical element 400 may not be installed in the left and right regions of the display device 300, thereby solving the above-described problems and making it possible to provide appropriate visions for the user. Note that various configurations shown in FIGS. 19 to 28 may be appropriately combined to be used.

Figure 29:
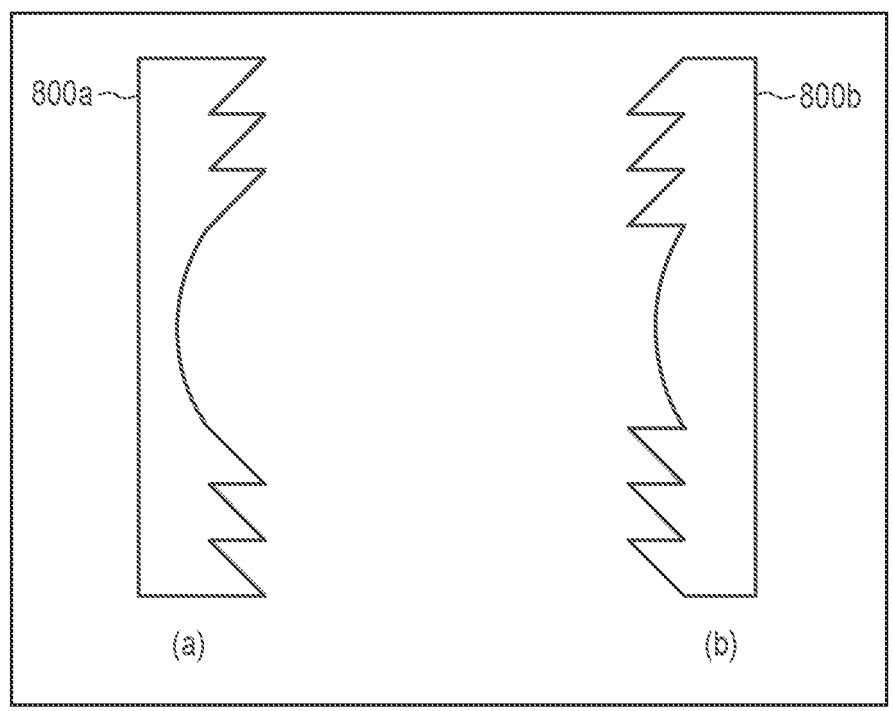
FIG. 29 is a diagram illustrating a Fresnel lens.

This embodiment is described on the assumption that both the first optical element 400 and the second optical element 500 are normal concave lenses and convex lenses, but the embodiment is not limited to this. For example, a Fresnel lens 800a shown in FIG. 29, part (a), which has characteristic of concave lens may be used as the first optical element 400, and a Fresnel lens 800b shown in FIG. 29, part (b), which has characteristics of convex lens may be used as the second optical element 500.

In this embodiment, the sizes of the first optical element 400 and the second optical element 500 should preferably be greater than that of the display area DA (that is, the display area which can display images) that constitutes the transparent display DSP.

According to the embodiment described above, it is possible to provide a display device and a helmet with which a near view and a distant view can be focused at the same time.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a transparent display comprising a display area including a plurality of pixels, a first surface comprising a display surface, and a second surface at an opposite side to the first surface;
a first optical element provided at a second surface side of the transparent display; and
a second optical element provided at a first surface side of the transparent display, wherein
the first optical element is configured to refract first entering light and to diverge the first entering light,
the second optical element is configured to refract second entering light in a direction in which the second entering light is condensed, and
a plurality of first optical elements each identical to the first optical element are provided at the second surface side of the transparent display.

2. The display device of claim 1, wherein
the plurality of first optical elements are adhered to the transparent display, and
the second optical element is adhered to the transparent display.

3. The display device of claim 1, wherein
the transparent display and the plurality first optical elements are provided respectively with a first interval therebetween, and
the transparent display and the second optical element are provided with a second interval therebetween.

4. The display device of claim 3, wherein
the first and second intervals are adjustable.

5. The display device of claim 1, wherein
the plurality of first optical elements are provided respectively at a position opposing a first region included in the second surface of the transparent display and at a position included in the second surface of the transparent display and opposing a second region different from the first region.

6. The display of claim 5, wherein
the transparent display is located in front of an eye of a user,
the first surface opposes the eye of the user,
a first distance between the first region and an object visually recognized by the user is longer than a second distance between the second region and the object, and
the first optical element provided at a position opposing the first region has a refractive index higher than that of the first optical element provided at a position opposing the second region.

7. The display device of claim 6, wherein
the first region is an upper region when the transparent display is virtually divided into upper and lower parts, and
the second region is a lower region when the transparent display is virtually divided into the upper and lower parts.

8. The display device of claim 6, wherein
the first region is a central region when the transparent display is virtually divided into three by two vertical lines, and
the second region is one of left and right regions or both the left and right regions when the transparent display is virtually divided into three by the two vertical lines.

9. The display device of claim 1, wherein
a size of each of the plurality of first optical elements is greater than the display area, and a size of the second optical element is greater than the display area.

10. The display device of claim 1, wherein
the plurality of first optical elements are each a concave lens, and
the second optical element is a convex lens.

11. The display device of claim 10, wherein
at least one of the plurality of first optical elements and the second optical element is a Fresnel lens.

12. The display device of claim 1, wherein
the plurality of first optical elements and the second optical element are each a liquid crystal lens.

13. A helmet comprising:
the display device of claim 1; and
a shield on which the display device is provided.

14. A helmet comprising:
a display device comprising a transparent display comprising a first surface opposing eyes of a user, a second surface at an opposite side to the first surface and a display area including a plurality of pixels, a first optical element provided at a second surface side of the transparent display and configured to refract first and to diverge the first entering light, and a second optical element provided at a first surface side of the transparent display and configured to refract second entering light in a direction in which the second entering light is condensed; and
a shield on which the display device provided at a position opposing at least one of the eyes of the user, wherein
the display device is provided on the shield at a position opposing one eye of the user, and
a third optical element having a same characteristics as those of the first optical device is provided on the shield at a position opposing an other eye of the user.

\* \* \* \* \*